(12) United States Patent
Nakasu et al.

(10) Patent No.: US 9,405,373 B2
(45) Date of Patent: Aug. 2, 2016

(54) RECOGNITION APPARATUS

(71) Applicant: KABUSHIKI KAISHA TOSHIBA, Minato-ku, Tokyo (JP)

(72) Inventors: Toshiaki Nakasu, Tokyo (JP); Tsukasa Ike, Tokyo (JP); Kazushige Ouchi, Saitama (JP); Ryuzo Okada, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 173 days.

(21) Appl. No.: 13/766,877

(22) Filed: Feb. 14, 2013

(65) Prior Publication Data

US 2013/0321261 A1 Dec. 5, 2013

(30) Foreign Application Priority Data

May 30, 2012 (JP) .................................. 2012-123222

(51) Int. Cl.
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0085121 | A1* | 4/2006 | Jeong | G01C 21/00 701/36 |
| 2010/0245238 | A1* | 9/2010 | Kumagai | G06F 3/0346 345/156 |
| 2011/0162946 | A1* | 7/2011 | Altonen | H01H 13/023 200/33 R |
| 2011/0193777 | A1* | 8/2011 | Zhou | G06F 3/0421 345/157 |
| 2012/0062456 | A1* | 3/2012 | Munekata | G06F 3/017 345/157 |
| 2012/0176552 | A1* | 7/2012 | Ryu | H04N 21/4223 348/734 |
| 2014/0055350 | A1 | 2/2014 | Clarkson | |

FOREIGN PATENT DOCUMENTS

| | | |
|---|---|---|
| JP | 04-130915 | 5/1992 |
| JP | 2003-316510 | 11/2003 |
| JP | 2005-352531 | 12/2005 |
| JP | 2010-182014 | 8/2010 |
| JP | 2011-529234 | 12/2011 |
| JP | 2012-063824 | 3/2012 |

OTHER PUBLICATIONS

Office Action of Notice of Rejection for Japanese Patent Application No. 2012-123222 Dated Jul. 1, 2014, 10 pgs.

* cited by examiner

*Primary Examiner* — Gerald Johnson
*Assistant Examiner* — Robert Michaud
(74) *Attorney, Agent, or Firm* — Amin, Turocy & Watson LLP

(57) ABSTRACT

The acquiring unit is configured to acquire positions of a particular part of a user in time series. The calculator is configured to calculate a feature value of a motion of the particular part from the positions acquired in time series. The comparing unit configured to compare the feature value and a first threshold. The recognizing unit is configured to recognize the motion of the particular part using a first recognition method and a second recognition method which is different from the first recognition method. The control unit configured to control the recognizing unit to select the first recognition method for recognizing a position or a motion of the particular part when the feature value is smaller than the first threshold, and select the second recognition method when the feature value is equal to or larger than the first threshold.

16 Claims, 27 Drawing Sheets

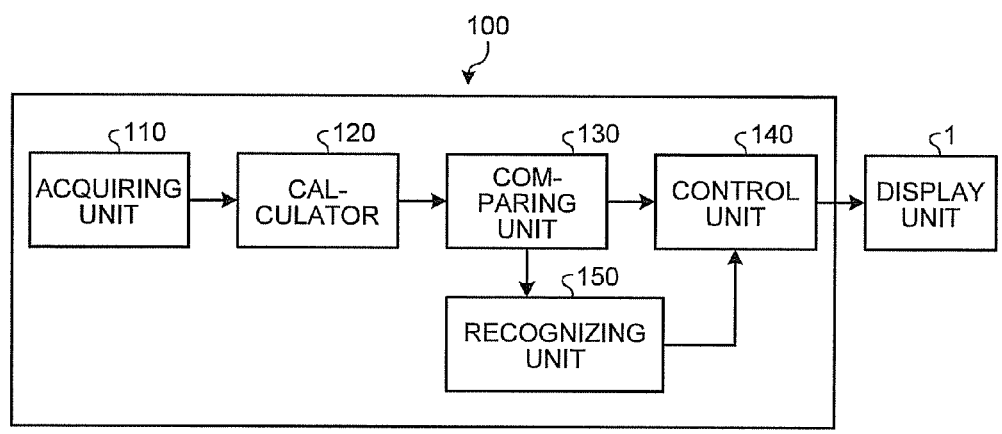
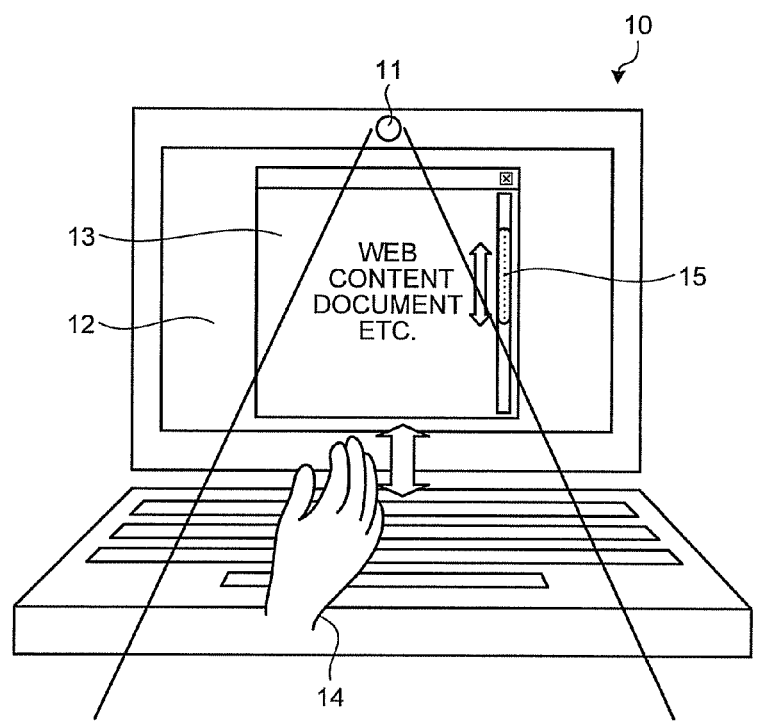

| CURRENT STATE | CONTROL |
|---|---|
| MOVING SPEED OF HAND <SECOND THRESHOLD | RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY |
| FIRST THRESHOLD ≤MOVING SPEED OF HAND | RECOGNITION: SECOND MODE DISPLAY: SECOND MODE |

FIG.11

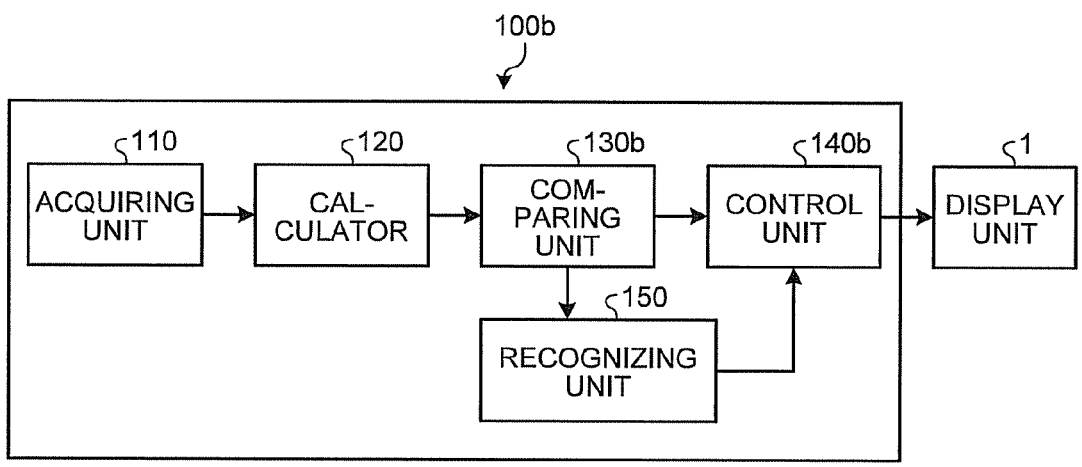

FIG.12

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY | RECOGNITION: FIRST MODE DISPLAY: FIRST MODE |
| FIRST THRESHOLD ≤MOVING SPEED OF HAND | RECOGNITION: SECOND MODE DISPLAY: SECOND MODE | RECOGNITION: SECOND MODE DISPLAY: SECOND MODE |

FIG.13

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | <WHEN HAND IS DETECTED TO BE STILL> RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY | |
| FIRST THRESHOLD ≤MOVING SPEED OF HAND | RECOGNITION: SECOND MODE DISPLAY: SECOND MODE | |

FIG.14

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | <WHEN STATE CONTINUES FOR PREDETERMINED TIME OR LONGER> RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY | |
| FIRST THRESHOLD ≤MOVING SPEED OF HAND | RECOGNITION: SECOND MODE DISPLAY: SECOND MODE | RECOGNITION: SECOND MODE DISPLAY: SECOND MODE |

FIG.15

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | <WHEN STATE CONTINUES FOR PREDETERMINED TIME OR LONGER> RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY | |
| FIRST THRESHOLD ≤MOVING SPEED OF HAND | <WHEN STATE CONTINUING TIME IS SHORTER THAN THRESHOLD> RECOGNITION: FIRST MODE DISPLAY: TEMPORARY DISPLAY <WHEN STATE CONTINUING TIME IS EQUAL TO OR LONGER THAN THRESHOLD> RECOGNITION: SECOND MODE DISPLAY: SECOND MODE | RECOGNITION: SECOND MODE DISPLAY: SECOND MODE |

FIG.16

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY A | RECOGNITION: FIRST MODE DISPLAY: TEMPORARY DISPLAY B |
| FIRST THRESHOLD ≤MOVING SPEED OF HAND | RECOGNITION: SECOND MODE DISPLAY: SECOND MODE | RECOGNITION: SECOND MODE DISPLAY: SECOND MODE |

FIG.17

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY A | RECOGNITION: FIRST MODE DISPLAY: FIRST MODE |
| FIRST THRESHOLD ≤MOVING SPEED OF HAND <THIRD THRESHOLD | RECOGNITION: SECOND MODE DISPLAY: SECOND MODE | RECOGNITION: SECOND MODE DISPLAY: TEMPORARY DISPLAY B |
| THIRD THRESHOLD ≤MOVING SPEED OF HAND | RECOGNITION: SECOND MODE DISPLAY: SECOND MODE | RECOGNITION: SECOND MODE DISPLAY: SECOND MODE |

FIG. 18

| CURRENT STATE \ PRECEDING MODE | FIRST MODE | SECOND MODE |
|---|---|---|
| MOVING SPEED OF HAND <SECOND THRESHOLD | RECOGNITION: FIRST MODE DISPLAY: FIRST MODE | <WHEN STATE CONTINUING TIME IS SHORTER THAN THRESHOLD> RECOGNITION: SECOND MODE DISPLAY: TEMPORARY DISPLAY B <WHEN STATE CONTINUING TIME IS EQUAL TO OR LONGER THAN THRESHOLD> RECOGNITION: FIRST MODE DISPLAY: FIRST MODE |
| SECOND THRESHOLD ≤MOVING SPEED OF HAND <FIRST THRESHOLD | RECOGNITION: FIRST MODE DISPLAY: TEMPORARY DISPLAY A | <WHEN STATE CONTINUING TIME IS SHORTER THAN THRESHOLD> RECOGNITION: SECOND MODE DISPLAY: TEMPORARY DISPLAY B <WHEN STATE CONTINUING TIME IS EQUAL TO OR LONGER THAN THRESHOLD> RECOGNITION: FIRST MODE DISPLAY: FIRST MODE |
| FIRST THRESHOLD ≤MOVING SPEED OF HAND <THIRD THRESHOLD | <WHEN STATE CONTINUING TIME IS SHORTER THAN THRESHOLD> RECOGNITION: FIRST MODE DISPLAY: TEMPORARY DISPLAY A <WHEN STATE CONTINUING TIME IS EQUAL TO OR LONGER THAN THRESHOLD> RECOGNITION: SECOND MODE DISPLAY: SECOND MODE | RECOGNITION: SECOND MODE DISPLAY: TEMPORARY DISPLAY B |
| THIRD THRESHOLD ≤MOVING SPEED OF HAND | <WHEN STATE CONTINUING TIME IS SHORTER THAN THRESHOLD> RECOGNITION: FIRST MODE DISPLAY: TEMPORARY DISPLAY A <WHEN STATE CONTINUING TIME IS EQUAL TO OR LONGER THAN THRESHOLD> RECOGNITION: SECOND MODE DISPLAY: SECOND MODE | RECOGNITION: SECOND MODE DISPLAY: SECOND MODE |

RECOGNITION APPARATUS

CROSS-REFERENCE TO RELATED APPLICATION

This application is based upon and claims the benefit of priority from Japanese Patent Application No. 2012-123222, filed on May 30, 2012; the entire contents of which are incorporated herein by reference.

FIELD

Embodiments described herein relate generally to a recognition apparatus.

BACKGROUND

Recognition apparatuses that recognize gestures that are predetermined motions of specific parts such as hands and fingers of users are known in related art. Such a recognition apparatus recognizes a gesture made by a user and operates a device to be operated. Examples of the device to be operated include information processing devices such as a personal computer (PC). One technique that utilizes a recognition apparatus is moving a mouse cursor on a PC screen in accordance with a gesture made by a user. Another technique that utilizes a recognition apparatus is executing various commands such as switching of PC screens in accordance with a gesture made by a user.

In the related art, however, there is a disadvantage that users may be made to select an operation mode of the device to be operated according to the gesture. For example, in a case where a mode of moving a mouse cursor and a mode of executing a command are set, a user has to select which mode to use since there are the same or similar gestures between these modes.

For realizing operations according to gestures, it is preferable that gestures that can be easily and intuitively made by the user be employed. Accordingly, both of a gesture for moving a mouse cursor downward and a gesture for moving a screen downward may be a downward hand motion. As a result, users may be made to select an operation mode of the device to be operated according to the gesture in the related art. A case in which a gesture is used to switch between modes can also be considered. This case, however, is not preferable for users because users need to make the gesture for switching between modes, which is troublesome.

BRIEF DESCRIPTION OF THE DRAWINGS

FIG. 1 is a block diagram illustrating a recognition apparatus according to a first embodiment;

FIG. 2 is an information processing device to which the recognition apparatus is applied;

FIG. 11 is a block diagram illustrating a recognition apparatus according to Modification 2 of the first embodiment;

FIGS. 12 to 18 are tables illustrating examples of control based on a feature value according to Modification 2 of the first embodiment;

DETAILED DESCRIPTION

Figure 3:
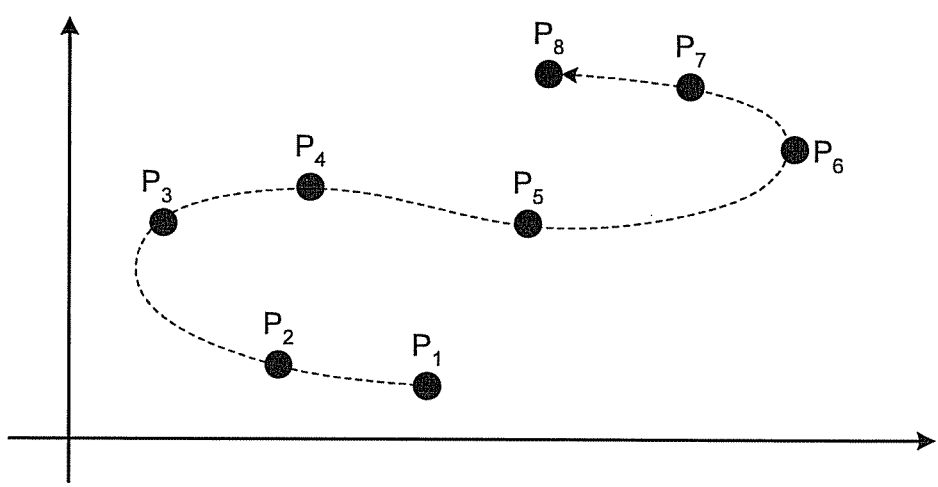
FIG. 3 is a graph illustrating positions of a particular part acquired in time series.

According to an embodiment, a recognition apparatus includes an acquiring unit, a calculator, a comparing unit, a recognizing unit and a control unit. The acquiring unit is configured to acquire positions of a particular part of a user in time series. The calculator is configured to calculate a feature value of a motion of the particular part from the positions acquired in time series. The comparing unit is configured to compare the feature value and a first threshold. The recognizing unit is configured to recognize the motion of the particular part using a first recognition method and a second recognition method which is different from the first recognition method. The control unit configured to control the recognizing unit to select the first recognition method for recognizing a position or a motion of the particular part when the feature value is smaller than the first threshold, and select the second recognition method when the feature value is equal to or larger than the first threshold.

First Embodiment

FIG. 1 is a block diagram illustrating an exemplary configuration of a recognition apparatus according to a first embodiment. As illustrated in FIG. 1, a recognition apparatus 100 includes an acquiring unit 110, a calculator 120, a comparing unit 130, a control unit 140 and a recognizing unit 150. For example, the recognition apparatus 100 is applied to an information processing device such as a personal computer (PC) equipped with an imaging device such as a camera and an imaging sensor, recognizes a gesture of a user and controls operation of the PC according to the recognized gesture. The camera takes time series images. The recognition apparatus 100 is connected to a display unit 1 included in the PC.

FIG. 2 is a diagram illustrating an example of the information processing device to which the recognition apparatus is applied. A recognition apparatus according to any of the embodiments below is applied to an information processing device 10 illustrated in FIG. 2. For example, the information processing device 10 is equipped with a camera 11 and images a user that is a subject. The user makes a gesture with a hand 14 so as to browse web contents and documents displayed in a window 13 on a screen 12 of the information processing device 10. As a result, a scroll bar 15 moves in response to the gesture to scroll the window 13. Alternatively, the user makes a gesture with the hand 14 so as to move a cursor displayed on the screen 12 (display unit 1) of the information processing device 10. As a result, the cursor moves in response to the gesture.

The acquiring unit 110 acquires positions of a particular part such as a hand or a finger of the user that is the subject in time series by detecting the particular part of the user from each of the time series images taken by the camera 11 and tracking the particular part in time series. The position of the particular part to be acquired is, for example, a median point of a detected area of the particular part that is a hand or a finger acquired from the imaging device. The position of the particular part to be acquired may be expressed by coordinates of a pixel position or the like defined on a taken image or may be expressed by relative coordinates from a detected position of a part such as the face of the user.

Alternatively, time at which each position is acquired may be saved in addition to the position. The time is expressed by elapsed time, the number of clocks elapsed, the number of frames elapsed or the like from when the recognition apparatus 100 is activated or when acquisition of positions is started that is assumed to be "0". For example, when the position is expressed by (x, y) coordinates on a taken image, a position $(x_i, y_i)$ acquired at an i-th frame and time "$T_i$" of acquisition are saved in association with each other.

FIG. 3 is a graph illustrating examples of positions of the particular part acquired in time series. As illustrated in FIG. 3, motion of the particular part follows a continuous trajectory in the order of "$P_1$", "$P_2$", "$P_3$", "$P_4$", "$P_5$", "$P_6$", "$P_7$", and "$P_8$" as expressed by a broken arrow. The acquiring unit 110 acquires the respective positions of "$P_1$" to "$P_8$" each as a discrete point obtained by sampling at the imaging device. Note that "$P_3$" and "$P_6$" illustrated in FIG. 3 may also be called "turning points".

The calculator 120 calculates a feature value of motion of the particular part such as a hand or a finger of the user that is a subject from the positions acquired by the acquiring unit 110. An example in which the moving speed of a hand is used as the feature value will be described here. For example, when the latest position acquired at time "$T_8$" is "$P_8$" and the previous position acquired at time "$T_7$" is "$P_7$" among the positions acquired by the acquiring unit 110, the calculator 120 calculates the moving speed "V" of the hand from "|(the distance between $P_8$ and $P_7$)/($T_8-T_7$)|".

The comparing unit 130 uses the moving speed of the hand calculated by the calculator 120 as the feature value and determines the relation between the moving speed of the hand and a first threshold representing a specific value of the moving speed. The comparing unit 130 then outputs the determination result on the relation between the moving speed of the hand and the first threshold to the control unit 140. Such a first threshold is used to determine whether to set a first mode in which a method of recognizing the position or the motion of the particular part such as a hand or a finger is used or a second mode in which a recognition method different from that of the first mode is used for performing control in response to a gesture of the user. In other words, according to one aspect of the present embodiment, the first mode or the second mode is selected depending on the moving speed of the hand.

The control unit 140 receives the determination result from the comparing unit 130, and selects the first mode when the moving speed of the hand is smaller than the first threshold or the second mode when the moving speed of the hand is equal to or larger than the first threshold. The control unit 140 also controls a display process of a screen to be displayed on the display unit 1 in response to gestures of the user in the first mode or the second mode that is selected. For example, the control unit 140 controls movement of a cursor displayed on the display unit 1 in the first mode or controls scrolling of the screen displayed on the display unit 1 in the second mode. Note that movement of the cursor in the first mode refers to movement of the cursor by pointing.

The recognizing unit 150 is configured to recognize the motion of the particular part using a first recognition method and a second recognition method which is different from the first recognition method.

Figure 4:
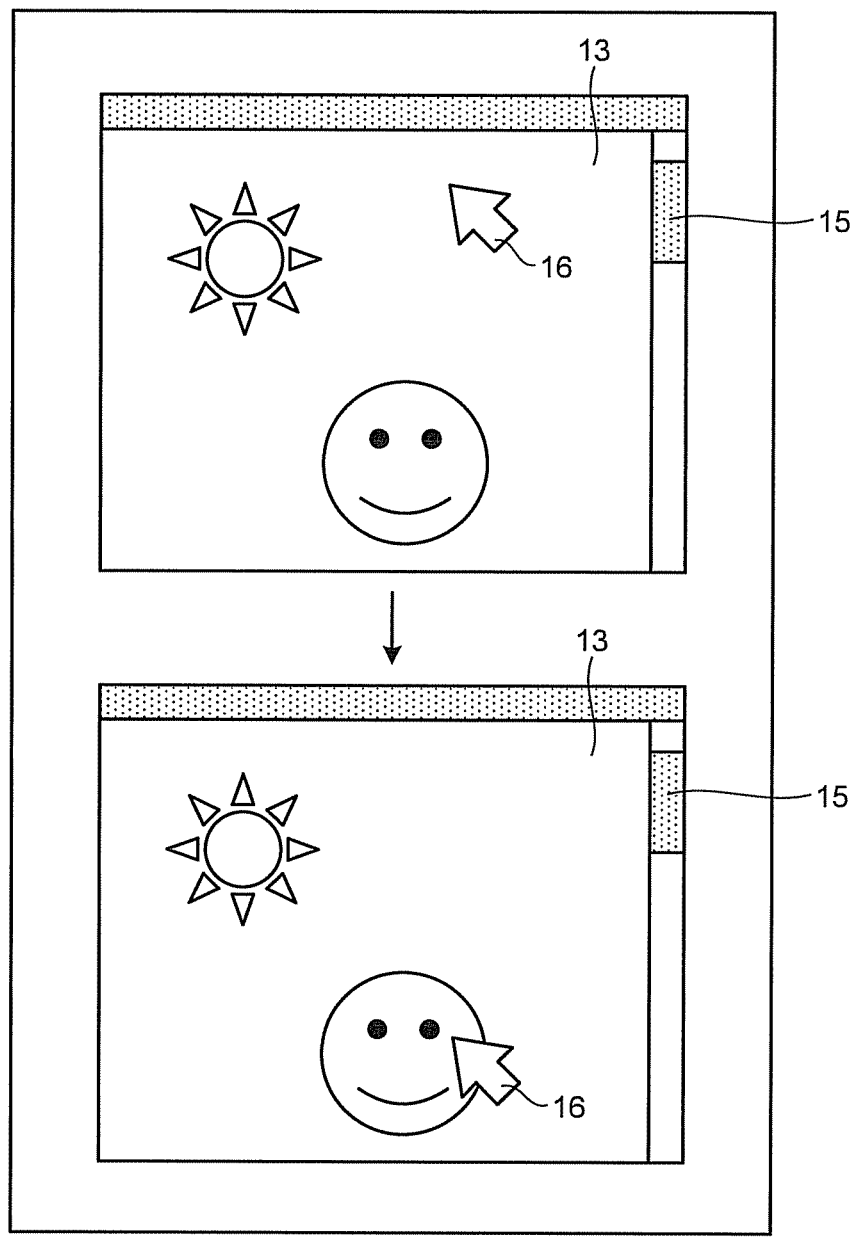
FIG. 4 is a diagram illustrating a screen display in a first mode.

FIG. 4 is a diagram illustrating an example of the screen display in the first mode. FIG. 4 illustrates a case in which the cursor on the screen is moved as an example of control in the first mode. When a gesture of moving a hand downward is made by the user in the state of the window 13 illustrated in the upper part of FIG. 4, a cursor 16 moves downward as in the window 13 illustrated in the lower part of FIG. 4. In the first mode, the scroll bar 15 does not move.

Figure 5:
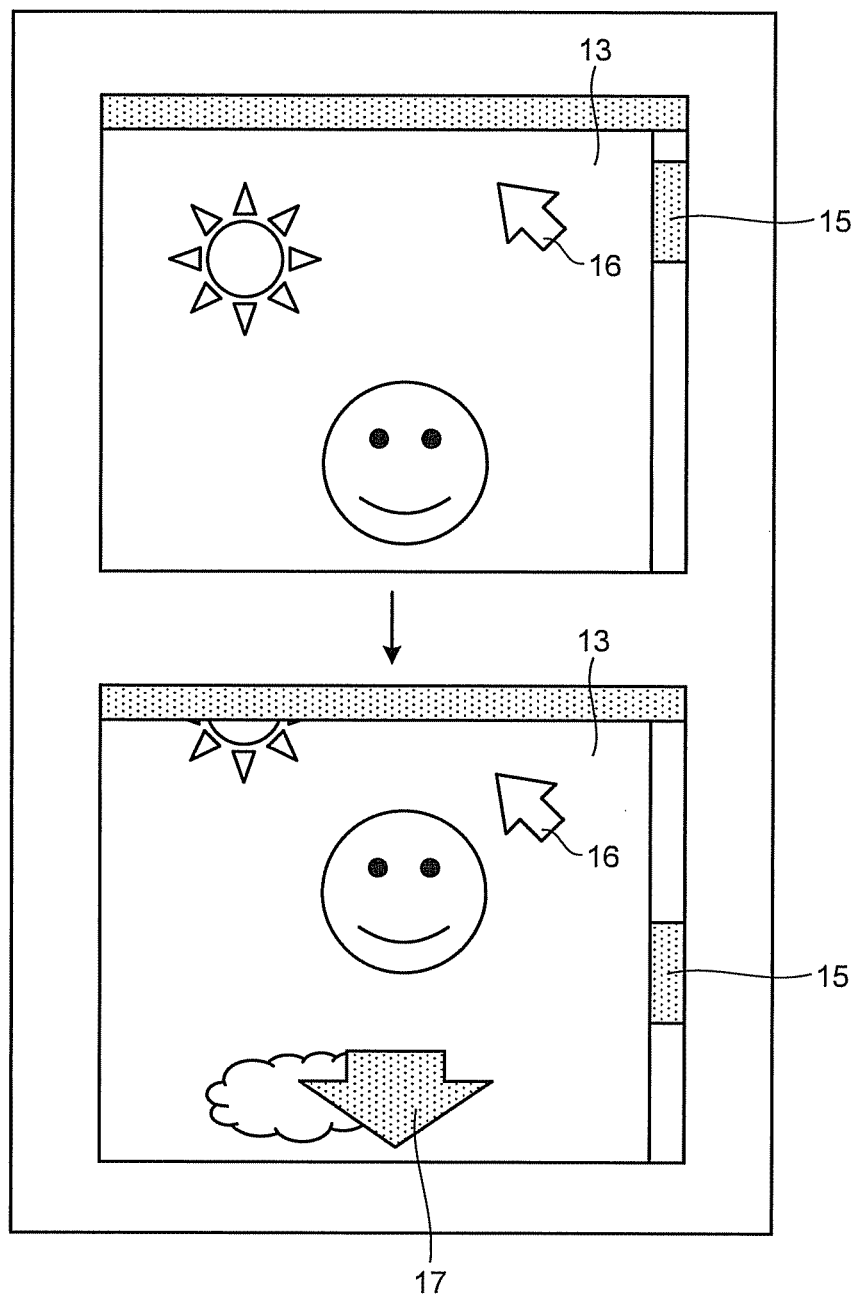
FIG. 5 is a diagram illustrating a screen display in a second mode.

FIG. 5 is a diagram illustrating an example of the screen display in the second mode. FIG. 5 illustrates a case in which the scroll bar on the screen is moved as an example of control in the second mode. When the gesture of moving a hand downward is made by the user in the state of the window 13 illustrated in the upper part of FIG. 5, the scroll bar 15 moves downward scrolling the window 13 downward as the window 13 illustrated in the lower part of FIG. 5. FIG. 5 also illustrates an example in which a block arrow 17 is displayed according to the moving direction of the scroll bar 15. In the second mode, the cursor 16 does not move.

Figure 6:
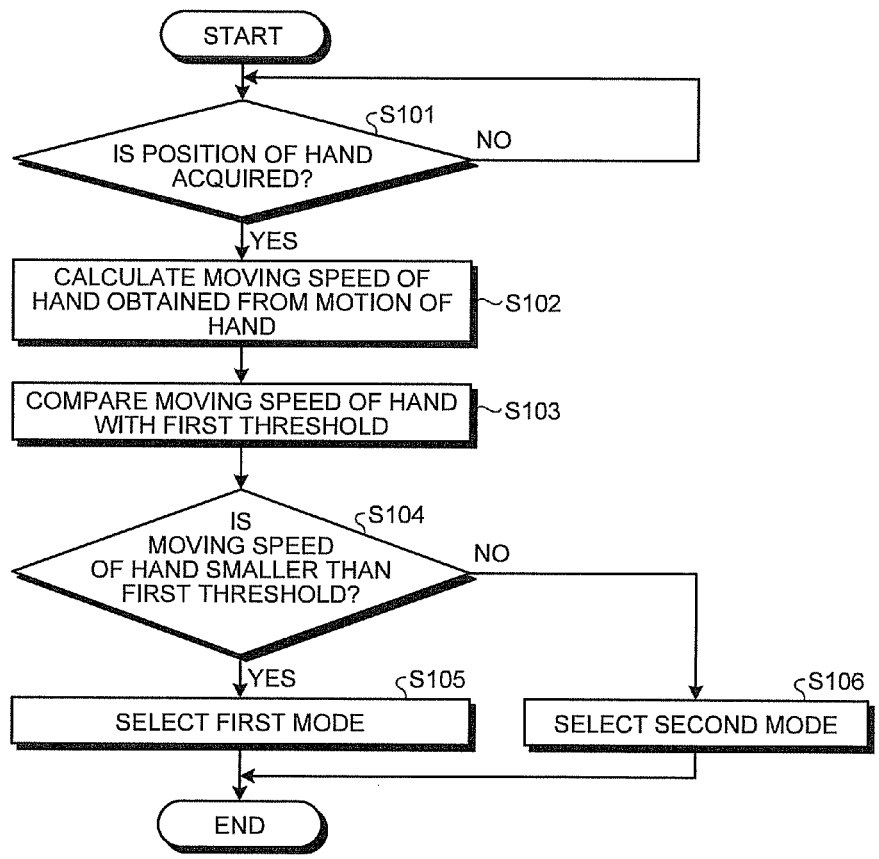
FIG. 6 is a flowchart illustrating overall processing according to the first embodiment.

Next, a flow of overall processing according to the first embodiment will be described with reference to FIG. 6. FIG. 6 is a flowchart illustrating an example of the flow of overall processing according to the first embodiment.

As illustrated in FIG. 6, if the position of a hand of the user is acquired by the acquiring unit 110 (step S101: Yes), the calculator 120 calculates the moving speed of the hand obtained from the motion of the hand (step S102). If the position of a hand of the user is not acquired by the acquiring unit 110 (step S101: No), on the other hand, a state of waiting for acquisition of the position is entered.

The comparing unit 130 compares the moving speed of the hand calculated by the calculator 120 with the first threshold (step S103). Then, if it is determined by the comparing unit 130 that the moving speed of the hand is smaller than the first threshold (step S104: Yes), the control unit 140 selects the first mode (step S105). If it is determined by the comparing unit 130 that the moving speed of the hand is equal to or larger than the first threshold (step S104: No), the control unit 140 selects the second mode (step S106). Accordingly, the recognizing unit 150 is configured to recognize the motion of the particular part using a first recognition method and a second recognition method which is different from the first recognition method.

According to the present embodiment, since the mode of gesture recognition for controlling the display process of the screen to be displayed on the display unit is selected according to the moving speed of the particular part in the gesture made by the user, the operability of switching between operation modes of a device to be operated according to the gesture can be improved. In other words, according to the present embodiment, since the operation for switching between operation modes of a device to be operated need not be performed by the user, the operability can be improved.

Modification 1 of First Embodiment

Figure 7:
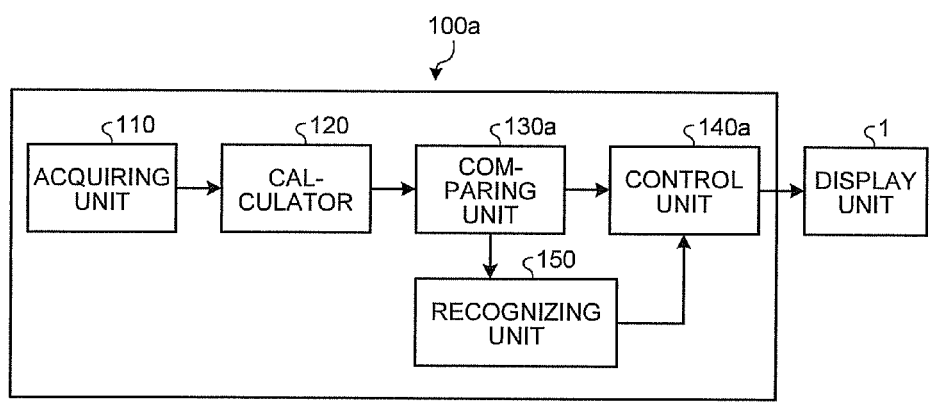
FIG. 7 is a block diagram illustrating a recognition apparatus according to Modification 1 of the first embodiment.

FIG. 7 is a block diagram illustrating an exemplary configuration a recognition apparatus according to Modification 1 of the first embodiment. In Modification 1 of the first embodiment, components similar to those in the first embodiment will be designated by the same reference numerals and detailed description thereof may not be repeated. In Modification 1 of the first embodiment, the functions, configurations and processing of the components other than a comparing unit 130a and a control unit 140a to be described below are the same as those in the first embodiment.

As illustrated in FIG. 7, a recognition apparatus 100a includes an acquiring unit 110, the calculator 120, the comparing unit 130a, the control unit 140a and the recognizing unit 150. Similarly to the first embodiment, the recognition apparatus 100a is connected to the display unit 1.

The comparing unit 130a uses the moving speed of the hand calculated by the calculator 120 as the feature value and determines the relation between the moving speed of the hand and the first threshold and the relation between the moving speed of the hand and a second threshold representing a value smaller than the first threshold. The comparing unit 130a then outputs the determination result on the relation between the moving speed of the hand and the first threshold and the determination result on the relation between the moving speed of the hand and the second threshold to the control unit 140a. Such a second threshold is used to determine whether or not the moving speed of the hand corresponds to that at a stage before transition from the first mode to the second mode for performing control in response to a gesture of the user. The stage before transition from the first mode to the second mode is a case in which a condition "the second threshold≤the moving speed of the hand<the first threshold" is satisfied. Thus, according to one aspect of the present embodiment, it is possible to inform the user that the mode may be shifted from the first mode to the second mode, that the first mode is entered from the second mode, or the like according to the moving speed of the hand.

The control unit 140a receives the determination results from the comparing unit 130, and selects the first mode when the moving speed of the hand is smaller than the first threshold (containing the state of being smaller than the second threshold) or the second mode when the moving speed of the hand is equal to or larger than the first threshold. The control unit 140a also controls the display process of the screen to be displayed on the display unit 1 in response to gestures of the user in the first mode or the second mode that is selected, and controls the display process of the screen to be displayed on the display unit 1 according to the moving speed of the hand when the moving speed of the hand is equal to or larger than the second threshold and smaller than the first threshold. In the control on the display process of the screen to be displayed on the display unit 1 when the moving speed is equal to or larger than the second threshold and smaller than the first threshold, the user is informed by the cursor that is displayed as temporary display different from the display in the first mode.

Figures 8, 9:
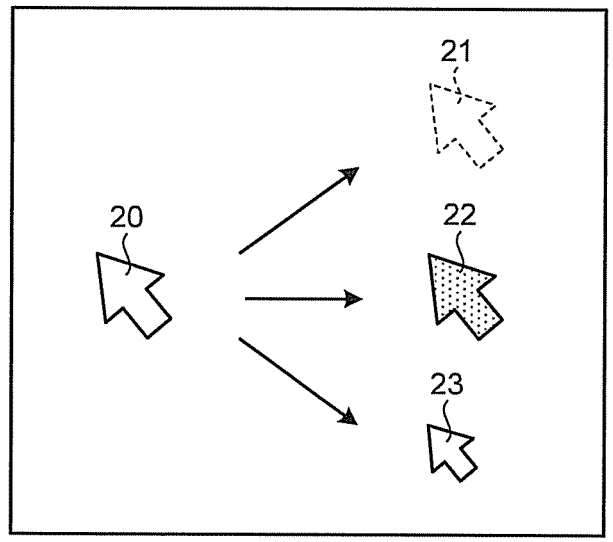
FIG. 8 is a table illustrating control based on a feature value according to Modification 1 of the first embodiment.
FIG. 9 is a diagram illustrating temporary display of a cursor.

FIG. 8 is a table illustrating examples of control based on a feature value according to Modification 1 of the first embodiment. FIG. 8 illustrates the moving speed of the hand that is the feature value, the "current state" representing the relation between the first threshold and the second threshold under the current state, and "control" representing control according to the current state. Among these examples, when the current state is "the moving speed of the hand<the second threshold", the recognition method and the display process are based on the "first mode". When the current state is "the second threshold the moving speed of the hand<the first threshold", the recognition method is based on the "first mode" and the display process is "temporary display". When the current state is "the first threshold≤the moving speed of the hand", the recognition method and the display process are based on the "second mode".

FIG. 9 is a diagram illustrating temporary display of the cursor. When the cursor display based on the first mode is a cursor 20, examples of the temporary display includes a cursor 21 that is a cursor display with changed transparency, a cursor 22 that is a cursor display with changed brightness, and a cursor 23 that is a cursor display with changed size as illustrated in FIG. 9. Alternatively, the chroma, the blink speed, the moving speed of the cursor (including stopping moving) may be changed, or the pop-up amount may be changed when three-dimensional display is possible.

The transparency, the brightness, the size and the like may be changed to a certain predetermined proportion such as changing the transparency to 50% or may be changed according to the moving speed of the hand that is the feature value. For example, the transparency is set to 100% when the moving speed of the hand is the first threshold, and the transparency is changed to 0% when the moving speed of the hand is the second threshold. In this case, when the feature value is represented by "E", the first threshold is represented by "E1", and the second threshold is represented by "E2", the transparency is "100×(E−E2)/(E1−E2)".

Figure 10:
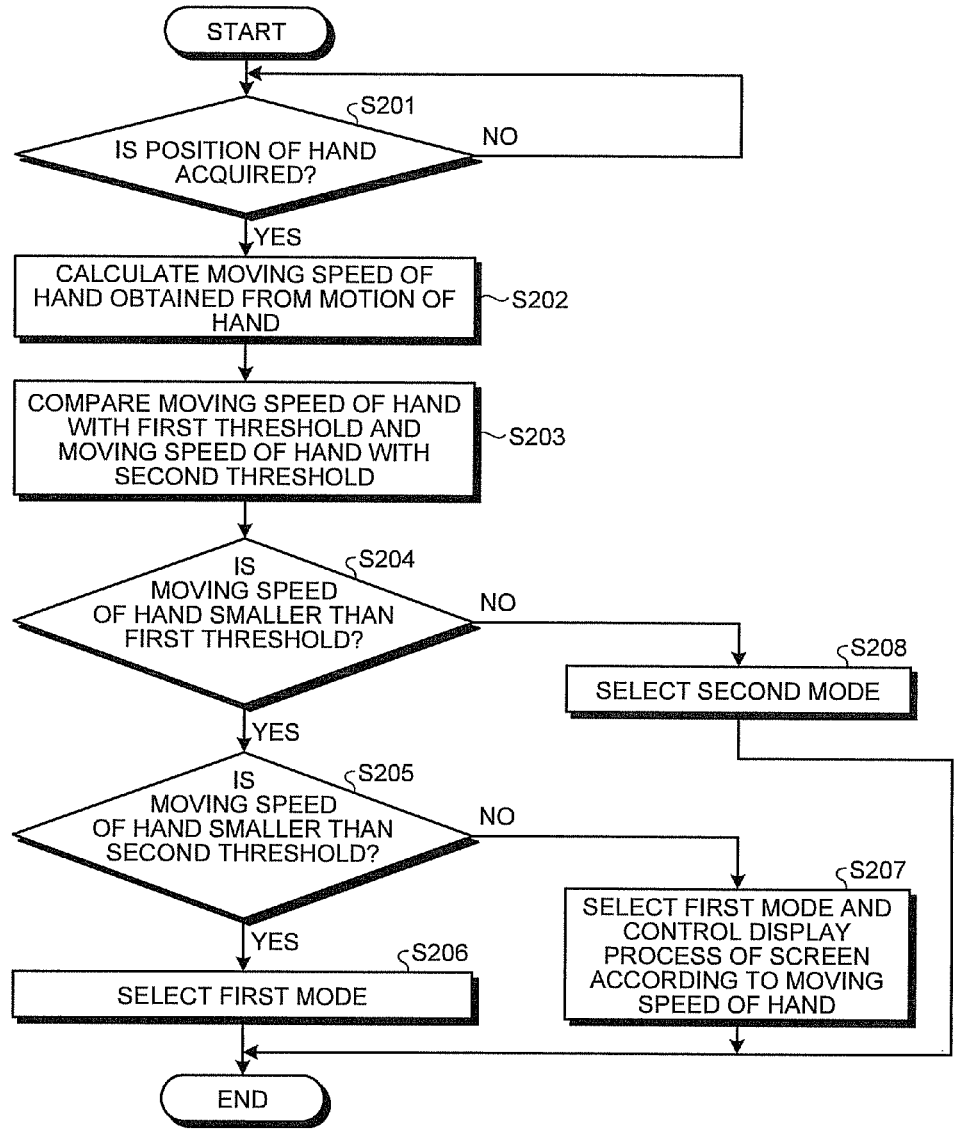
FIG. 10 is a flowchart illustrating overall processing according to Modification 1 of the first embodiment.

Next, a flow of overall processing according to Modification 1 of the first embodiment will be described with reference to FIG. 10. FIG. 10 is a flowchart illustrating an example of the flow of overall processing according to Modification 1 of the first embodiment.

As illustrated in FIG. 10, if the position of a hand of the user is acquired by the acquiring unit 110 (step S201: Yes), the calculator 120 calculates the moving speed of the hand obtained from the motion of the hand (step S202). If the position of a hand of the user is not acquired by the acquiring unit 110 (step S201: No), on the other hand, a state of waiting for acquisition of the position is entered.

The comparing unit 130a compares the moving speed of the hand calculated by the calculator 120 with the first threshold and the moving speed of the hand with the second threshold (step S203). Then, if it is determined by the comparing unit 130a that the moving speed of the hand is smaller than the second threshold (step S204: Yes, step S205: Yes), the control unit 140a selects the first mode (step S206).

If it is determined by the comparing unit 130a that the moving speed of the hand is equal to or larger than the second threshold and smaller than the first threshold (step S204: Yes, step S205: No), the control unit 140a selects the first mode and controls the display process of the screen according to the moving speed of the hand (step S207). If it is determined by the comparing unit 130a that the moving speed of the hand is equal to or larger than the first threshold (step S204: No), the control unit 140a selects the second mode (step S208). Accordingly, the recognizing unit 150 is configured to recognize the motion of the particular part using a first recognition method and a second recognition method which is different from the first recognition method.

According to the present embodiment, since the display of the cursor or the like is switched to temporary display at a stage before transition from the first mode to the second mode, it is possible to allow the user to recognize that the mode may be shifted from the first mode to the second mode, that the first mode is entered from the second mode, or the like. In addition, according to the present embodiment, since the operation for switching between operation modes of a device to be operated need not be performed by the user, the operability can be improved.

Modification 2 of First Embodiment

FIG. 11 is a block diagram illustrating an exemplary configuration of a recognition apparatus according to Modification 2 of the first embodiment. In Modification 2 of the first embodiment, components similar to those in the first embodiment will be designated by the same reference numerals and detailed description thereof may not be repeated. In Modification 2 of the first embodiment, the functions, configurations and processing of the components other than a comparing unit 130b and a control unit 140b to be described below are the same as those in the first embodiment.

As illustrated in FIG. 1, a recognition apparatus 100b includes the acquiring unit 110, the calculator 120, a comparing unit 130b, a control unit 140b and the recognizing unit 150. Similarly to the first embodiment, the recognition apparatus 100b is connected to the display unit 1. In Modification 2 of the first embodiment, the recognition method and the display process change according to the moving speed of the hand that is a feature value, the "current state" representing the relation between the first threshold and the second threshold under the current state, and the "preceding mode" indicating which of the first mode and the second mode the preceding mode is. In the following, the recognition method and the display process in respective patterns will be described with reference to FIGS. 12 to 18. FIGS. 12 to 18 are tables illustrating examples of the recognition method and the display process depending on the relation between the current state and the preceding mode according to Modification 2 of the first embodiment.

In FIG. 12, the comparing unit 130b determines that the moving speed of the hand is smaller than the second threshold. As a result, when the preceding mode is the first mode, the control unit 140b controls the recognition method and the display process of the screen to be displayed on the display unit 1 as being based on the "first mode". When the preceding mode is the second mode, on the other hand, the control unit 140b controls the recognition method and the display process of the screen to be displayed on the display unit 1 as being based on the "first mode".

In another example, the comparing unit 130b determines that the moving speed of the hand is equal to or larger than the second threshold and smaller than the first threshold in FIG. 12. As a result, when the preceding mode is the first mode, the control unit 140b controls the recognition method as being based on the "first mode" and the display process of the screen to be displayed on the display unit 1 as "temporary display". When the preceding mode is the second mode, on the other hand, the control unit 140b controls the recognition method and the display process of the screen to be displayed on the display unit 1 as being based on the "first mode".

In another example, the comparing unit 130b determines that the moving speed of the hand is equal to or larger than the first threshold in FIG. 12. As a result, when the preceding mode is the first mode, the control unit 140b controls the recognition method and the display process of the screen to be displayed on the display unit 1 as being based on the "second mode". When the preceding mode is the second mode, on the other hand, the control unit 140b controls the recognition method and the display process of the screen to be displayed on the display unit 1 as being based on the "second mode".

In FIG. 13, the comparing unit 130b and the control unit 140b perform the same processing as that described with reference to FIG. 12. In addition, the calculator 120 calculates the moving distance of the hand that is a particular part of the user as a feature value. When the moving distance of the hand calculated by the calculator 120 is within a predetermined range for a predetermined time or longer, the control unit 140b then controls the recognition method and the display process of the screen to be displayed on the display unit 1 as being based on the "first mode". The case in which the moving distance of the hand is within a predetermined range for a predetermined time or lower means that the hand is detected to be still. Specifically, since motion such as slight shake of the hand of the user may occur, the hand is detected to be still when the moving distance of the hand is within the predetermined range for the predetermined time or longer.

In another example, the comparing unit 130b determines that the moving speed of the hand is smaller than the second threshold in FIG. 14. As a result, when the preceding mode is the first mode, the control unit 140b controls the recognition method and the display process of the screen to be displayed on the display unit 1 as being based on the "first mode". When the state of being smaller than the first threshold (containing the state of being smaller than the second threshold) continues for a predetermined time or longer according to the determination by the comparing unit 130b in a state in which the second mode is selected, the control unit 140b controls the recognition method and the display process of the screen to be displayed on the display unit 1 as being based on the "first mode". Note that temporary display may be provided so as to inform the user that the first mode may be entered at a time point when a certain proportion of the predetermined time has elapsed.

In another example, the comparing unit 130b determines that the moving speed of the hand is equal to or larger than the second threshold and smaller than the first threshold in FIG. 14. As a result, when the preceding mode is the first mode, the control unit 140b controls the recognition method as being based on the "first mode" and the display process of the screen to be displayed on the display unit 1 as "temporary display". When the state of being smaller than the first threshold continues for the predetermined time or longer according to the determination by the comparing unit 130b in a state in which the second mode is selected, the control unit 140b controls the recognition method and the display process of the screen to be displayed on the display unit 1 as being based on the "first mode". Note that temporary display may be provided so as to inform the user that the first mode may be entered at a time point when a certain proportion of the predetermined time has elapsed.

When the moving speed of the hand is equal to or larger than the first threshold in FIG. 14, the comparing unit 130b and the control unit 140*b* perform the same processing as that described with reference to FIG. 12. Alternatively, when the state of being equal to or longer than the first threshold continues for the predetermined time or longer according to the determination by the comparing unit 130*b* in a state in which the first mode is selected, the control unit 140*b* may control the recognition method and the display process of the screen to be displayed on the display unit 1 as being based on the "second mode".

In another example, the comparing unit 130*b* determines that the moving speed of the hand is equal to or larger than the first threshold in FIG. 15. As a result, when the time for which the state of being equal to or larger than the first threshold has continued is shorter than the predetermined threshold according to the determination by the comparing unit 130*b* in a state in which the first mode is selected, the control unit 140*b* controls the recognition method as being based on the "first mode" and controls the display process of the screen to be displayed on the display unit 1 as "temporary display". When, on the other hand, the time for which the state of being equal to or larger than the first threshold has continued is equal to or longer than the predetermined threshold according to the determination by the comparing unit 130*b* in a state in which the first mode is selected, the control unit 140*b* controls the recognition method and the display process of the screen to be displayed on the display unit 1 as being based on the "second mode". When the preceding mode is the second mode, on the other hand, the control unit 140*b* controls the recognition method and the display process of the screen to be displayed on the display unit 1 as being based on the "second mode". When the moving speed of the hand is smaller than the first threshold (containing the state of being smaller than the second threshold) in FIG. 15, the comparing unit 130*b* and the control unit 140*b* perform the same processing as that described with reference to FIG. 14. According to the example of FIG. 15, it is possible to realize control with reduced influence of noise even if noise is produced in one frame of the value of the moving speed of the hand that is a feature value.

In another example, the comparing unit 130*b* determines that the moving speed of the hand is equal to or larger than the second threshold and smaller than the first threshold in FIG. 16. As a result, when the preceding mode is the first mode, the control unit 140*b* controls the recognition method as being based on the "first mode" and the display process of the screen to be displayed on the display unit 1 as "temporary display A". When the preceding mode is the second mode, the control unit 140*b* controls the recognition method as being based on the "first mode" and the display process of the screen to be displayed on the display unit 1 as "temporary display B". The "temporary display A" and the "temporary display B" are different from each other. When the moving speed of the hand is smaller than the first threshold and when the moving speed of the hand is equal to or larger than the first threshold in FIG. 16, the comparing unit 130*b* and the control unit 140*b* perform the same processing as that described with reference to FIG. 12.

In an example of FIG. 17, a third threshold that is larger than the first threshold is further used. In FIG. 17, the comparing unit 130*b* determines that the moving speed of the hand is equal to or larger than the second threshold and smaller than the first threshold. As a result, when the preceding mode is the first mode, the control unit 140*b* controls the recognition method as being based on the "first mode" and the display process of the screen to be displayed on the display unit 1 as "temporary display A". When the preceding mode is the second mode, on the other hand, the control unit 140*b* controls the recognition method and the display process of the screen to be displayed on the display unit 1 as being based on the "first mode".

In another example, the comparing unit 130*b* determines that the moving speed of the hand is equal to or larger than the second threshold and smaller than the third threshold in FIG. 17. As a result, when the preceding mode is the first mode, the control unit 140*b* controls the recognition method and the display process of the screen to be displayed on the display unit 1 as being based on the "second mode". When the preceding mode is the second mode, the control unit 140*b* controls the recognition method as being based on the "second mode" and the display process of the screen to be displayed on the display unit 1 as "temporary display B".

In another example, the comparing unit 130*b* determines that the moving speed of the hand is equal to or larger than the third threshold in FIG. 17. As a result, when the preceding mode is the first mode, the control unit 140*b* controls the recognition method and the display process of the screen to be displayed on the display unit 1 as being based on the "second mode". When the preceding mode is the second mode, on the other hand, the control unit 140*b* controls the recognition method and the display process of the screen to be displayed on the display unit 1 as being based on the "second mode". When the moving speed of the hand is smaller than the second threshold, the comparing unit 130*b* and the control unit 140*b* perform the same processing as that described with reference to FIG. 12.

The third threshold is also used in FIG. 18 similarly to the example of FIG. 17. In FIG. 18, the comparing unit 130*b* determines that the moving speed of the hand is smaller than the second threshold. As a result, when the preceding mode is the first mode, the control unit 140*b* controls the recognition method and the display process of the screen to be displayed on the display unit 1 as being based on the "first mode". When the time for which the state of being smaller than the first threshold has continued is shorter than the predetermined threshold according to the determination by the comparing unit 130*b* in a state in which the second mode is selected, the control unit 140*b* controls the recognition method as being based on the "second mode" and controls the display process of the screen to be displayed on the display unit 1 as "temporary display B". When, on the other hand, the time for which the state of being smaller than the second threshold has continued is equal to or longer than the predetermined threshold according to the determination by the comparing unit 130*b* in a state in which the second mode is selected, the control unit 140*b* controls the recognition method and the display process of the screen to be displayed on the display unit 1 as being based on the "first mode".

In another example, the comparing unit 130*b* determines that the moving speed of the hand is equal to or larger than the second threshold and smaller than the first threshold in FIG. 18. As a result, when the preceding mode is the first mode, the control unit 140*b* controls the recognition method as being based on the "first mode" and the display process of the screen to be displayed on the display unit 1 as "temporary display A". When the time for which the state of being equal to or larger than the second threshold and smaller than the first threshold has continued is shorter than the predetermined threshold according to the determination by the comparing unit 130*b* in a state in which the second mode is selected, the control unit 140*b* controls the recognition method as being based on the "second mode" and controls the display process of the screen to be displayed on the display unit 1 as "temporary display B". When, on the other hand, the time for which the state of being equal to or larger than the second threshold and smaller than the first threshold has continued is equal to or longer than the predetermined threshold according to the determination by the comparing unit 130b in a state in which the second mode is selected, the control unit 140b controls the recognition method and the display process of the screen to be displayed on the display unit 1 as being based on the "first mode".

In another example, the comparing unit 130b determines that the moving speed of the hand is equal to or larger than the first threshold and smaller than the third threshold in FIG. 18. As a result, when the time for which the state of being equal to or larger than the first threshold and smaller than the third threshold has continued is shorter than the predetermined threshold according to the determination by the comparing unit 130b in a state in which the first mode is selected, the control unit 140b controls the recognition method as being based on the "first mode" and controls the display process of the screen to be displayed on the display unit 1 as "temporary display A". When, on the other hand, the time for which the state of being equal to or larger than the first threshold and smaller than the third threshold has continued is equal to or longer than the predetermined threshold according to the determination by the comparing unit 130b in a state in which the first mode is selected, the control unit 140b controls the recognition method and the display process of the screen to be displayed on the display unit 1 as being based on the "second mode". When the preceding mode is the second mode, the control unit 140b controls the recognition method as being based on the "second mode" and the display process of the screen to be displayed on the display unit 1 as "temporary display B".

In another example, the comparing unit 130b determines that the moving speed of the hand is equal to or larger than the third threshold in FIG. 18. As a result, when the time for which the state of being equal to or larger than the third threshold has continued is shorter than the predetermined threshold according to the determination by the comparing unit 130b in a state in which the first mode is selected, the control unit 140b controls the recognition method as being based on the "first mode" and controls the display process of the screen to be displayed on the display unit 1 as "temporary display A". When, on the other hand, the time for which the state of being equal to or larger than the third threshold has continued is equal to or longer than the predetermined threshold according to the determination by the comparing unit 130b in a state in which the first mode is selected, the control unit 140b controls the recognition method and the display process of the screen to be displayed on the display unit 1 as being based on the "second mode". When the preceding mode is the second mode, on the other hand, the control unit 140b controls the recognition method and the display process of the screen to be displayed on the display unit 1 as being based on the "second mode".

According to the present embodiment, since the display of the cursor is switched to temporary display at a stage before transition to each of the first mode and the second mode, it is possible to allow the user to recognize that a mode may be entered or that a mode is entered. Furthermore, according to the present embodiment, the modes are switched therebetween and the display of the cursor is switched to temporary display according to the continuing time of the state of the feature value such as the moving speed of the hand, it is possible to allow the user to recognized that that a mode may be entered or that a mode is entered. In addition, according to the present embodiment, since the operation for switching between operation modes of a device to be operated need not be performed by the user, the operability can be improved.

Modification 3 of First Embodiment

Figure 19:
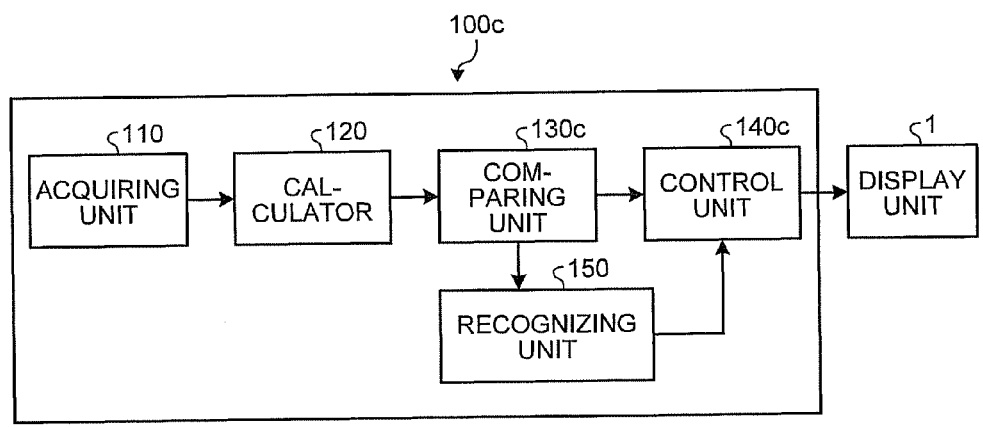
FIG. 19 is a block diagram illustrating a recognition apparatus according to Modification 3 of the first embodiment.

FIG. 19 is a block diagram illustrating an exemplary configuration a recognition apparatus according to Modification 3 of the first embodiment. In Modification 3 of the first embodiment, components similar to those in the first embodiment will be designated by the same reference numerals and detailed description thereof may not be repeated. In Modification 3 of the first embodiment, the functions, configurations and processing of the components other than a comparing unit 130c and a control unit 140c to be described below are the same as those in the first embodiment.

As illustrated in FIG. 19, a recognition apparatus 100c includes the acquiring unit 110, the calculator 120, a comparing unit 130c, a control unit 140c and the recognizing unit 150. Similarly to the first embodiment, the recognition apparatus 100c is connected to the display unit 1. In Modification 3 of the first embodiment, the first threshold is different from that in the first embodiment. Specifically, a value that is larger or smaller than the first threshold by a predetermined value is used as a threshold in Modification 3 of the first embodiment. More specifically, in a state in which the first mode is selected, a value that is larger than the first threshold by a predetermined value is a fourth threshold. In a state in which the second mode is selected, on the other hand, a value that is smaller than the first threshold by a predetermined value is a fifth threshold.

When the current state is the "first mode", the comparing unit 130c uses the fourth threshold that is larger than the first threshold by a predetermined value to determine the relation between the moving speed of the hand calculated by the calculator 120 and the fourth threshold. The comparing unit 130c then outputs the determination result on the relation between the moving speed of the hand and the fourth threshold to the control unit 140c. When the current state is the "second mode", on the other hand, the comparing unit 130c uses the fifth threshold that is smaller than the first threshold by a predetermined value to determine the relation between the moving speed of the hand calculated by the calculator 120 and the fifth threshold. The comparing unit 130c then outputs the determination result on the relation between the moving speed of the hand and the fifth threshold to the control unit 140c.

The control unit 140c receives the determination result from the comparing unit 130, and selects the first mode when the moving speed of the hand is smaller than the fourth threshold or the second mode when the moving speed of the hand is equal to or larger than the fourth threshold. Alternatively, the control unit 140c receives the determination result from the comparing unit 130, and selects the first mode when the moving speed of the hand is smaller than the fifth threshold or the second mode when the moving speed of the hand is equal to or larger than the fifth threshold. The control unit 140c also controls the display process of the screen to be displayed on the display unit 1 in response to gestures of the user in the first mode or the second mode that is selected.

Figure 20:
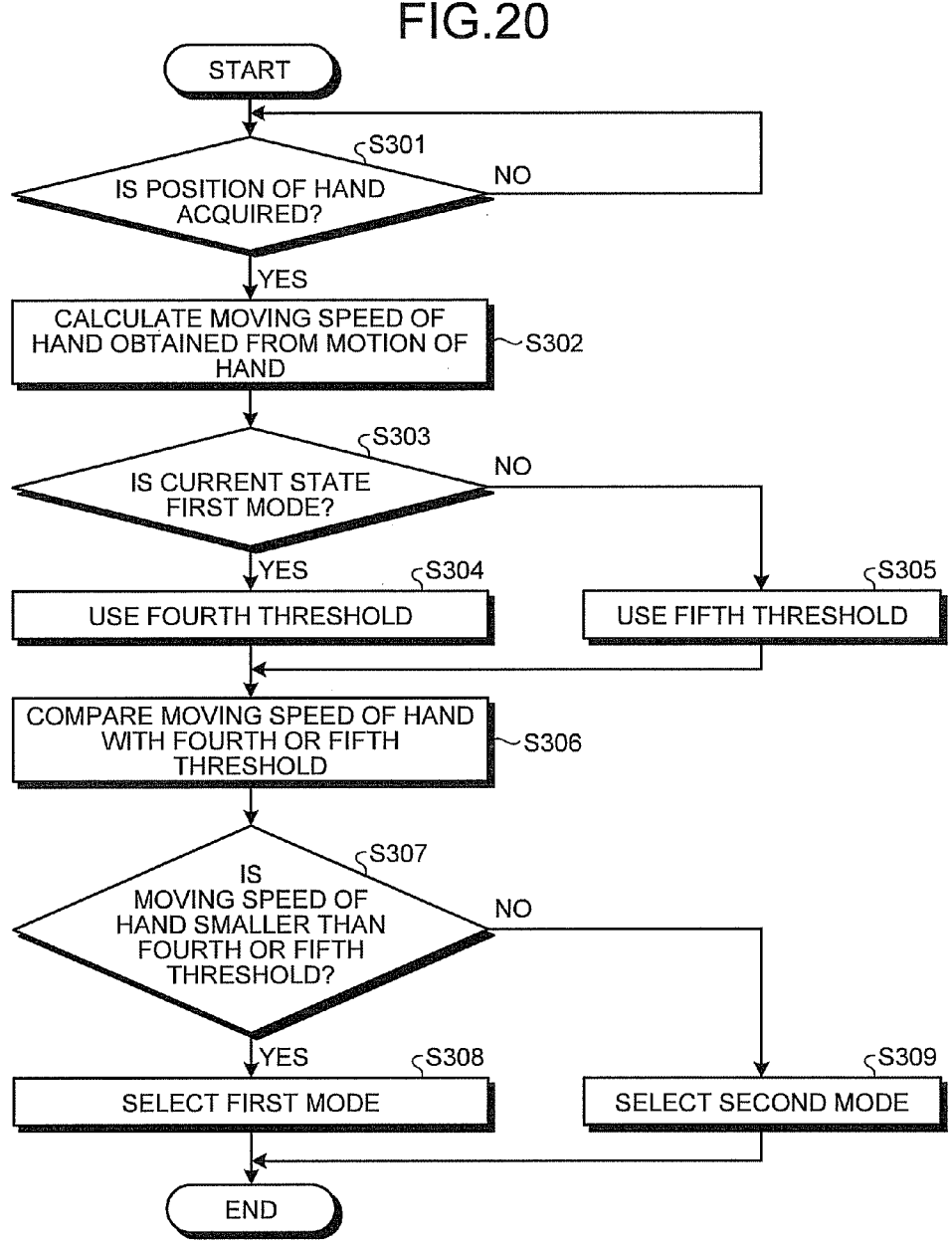
FIG. 20 is a flowchart illustrating overall processing according to Modification 3 of the first embodiment.

Next, a flow of overall processing according to Modification 3 of the first embodiment will be described with reference to FIG. 20. FIG. 20 is a flowchart illustrating an example of the flow of overall processing according to Modification 3 of the first embodiment.

As illustrated in FIG. 20, if the position of a hand of the user is acquired by the acquiring unit 110 (step S301: Yes), the calculator 120 calculates the moving speed of the hand obtained from the motion of the hand (step S302). If the position of a hand of the user is not acquired by the acquiring unit 110 (step S301: No), on the other hand, a state of waiting for acquisition of the position is entered.

In addition, if the current state is the first mode (step S303: Yes), the comparing unit 130c determines to use the fourth threshold that is a value larger than the first threshold by a predetermined value (step S304). If the current state is the second mode (step S303: No), on the other hand, the comparing unit 130c determines to use the fifth threshold that is a value smaller than the first threshold by a predetermined value (step S305). Accordingly, the comparing unit 130c compares the moving speed of the hand with the fourth or the fifth threshold (step S306).

Then, if it is determined by the comparing unit 130c that the moving speed of the hand is smaller than the fourth or the fifth threshold (step S307: Yes), the control unit 140c selects the first mode (step S308). If, on the other hand, it is determined by the comparing unit 130 that the moving speed of the hand is equal to or larger than the fourth or the fifth threshold (step S307: No), the control unit 140c selects the second mode (step S309). Accordingly, the recognizing unit 150 is configured to recognize the motion of the particular part using a first recognition method and a second recognition method which is different from the first recognition method.

According to the present embodiment, since the fourth threshold that is larger than the first threshold by a predetermined value is used in the first mode and the fifth threshold that is smaller than the first threshold by a predetermined value is used in the second mode, it is possible to make switching of modes less easy. In other words, according to the present embodiment, it is possible to prevent the modes from being easily switched therebetween as a result of inadvertent gestures.

Modification 4 of First Embodiment

Figure 21:
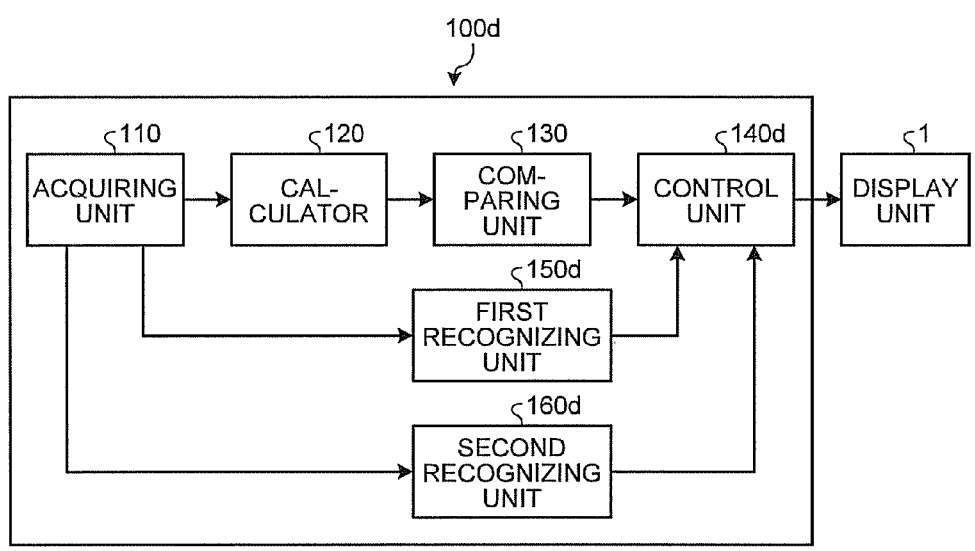
FIG. 21 is a block diagram illustrating a recognition apparatus according to Modification 4 of the first embodiment.

FIG. 21 is a block diagram illustrating an exemplary configuration a recognition apparatus according to Modification 4 of the first embodiment. In Modification 4 of the first embodiment, components similar to those in the first embodiment will be designated by the same reference numerals and detailed description thereof may not be repeated. In Modification 4 of the first embodiment, the functions, configurations and processing of the components other than a control unit 140d, a first recognizing unit 150d and a second recognizing unit 160d to be described below are the same as those in the first embodiment.

As illustrated in FIG. 21, a recognition apparatus 100d includes the acquiring unit 110, the calculator 120, the comparing unit 130, the control unit 140d, the first recognizing unit 150d, and the second recognizing unit 160d. Similarly to the first embodiment, the recognition apparatus 100d is connected to the display unit 1.

The first recognizing unit 150d recognizes the position and the motion of a particular part such as a hand or a finger of the user by a recognition method associated with the first mode from the positions acquired in time series by the acquiring unit 110. The first recognizing unit 150d then outputs the recognized position and motion to the control unit 140d. The recognition by the first recognizing unit 150d is performed each time a position is acquired by the acquiring unit 110. Note that the first mode is a mode for recognizing a gesture for moving a cursor according to one aspect.

In addition, in the recognition by the first recognizing unit 150d, the positions acquired by the acquiring unit 110 may be output without any change or may be corrected before being output. The correction of a position may be such that a relative position from the position at which detection of a hand is started is the position to be output, for example. Alternatively, the motion may be smoothed by applying a Kalman filter or the like and the resulting position may be the position to be output. In addition, since the first mode is a mode for moving the cursor as described above, it is preferable to output a position limited within a moving range so that the cursor may not be moved to outside of the screen.

The second recognizing unit 160d recognizes the position and the motion of a particular part such as a hand or a finger of the user by a recognition method associated with the second mode from the positions acquired in time series by the acquiring unit 110. The second recognizing unit 160d then outputs a command according to the recognized position and the direction of the recognized motion to the control unit 140d. The recognition by the second recognizing unit 160d is performed each time a position is acquired by the acquiring unit 110. Note that the second mode is a mode for recognizing a gesture for a command on the corresponding direction such as the direction for moving the scroll bar on the screen according to one aspect.

In the recognition by the second recognizing unit 160d, the command direction and the progress rate (0 to 1) to determination of the command may be output. Such a progress rate is, for example, "0" at time "$T_j$" at which acquisition of positions by the acquiring unit 110 is started, "1" at time "$T_j+T_{0a}$" when a predetermined time "$T_{0a}$" has passed, and a value obtained by linearly interpolating the period between time "$T_j$" and time "$T_j+T_{0a}$". In this case, the progress rate at time "t ($T_j \le t \le T_j+T_{0a}$)" is "$(t-T_j)/T_{0a}$". Thus, the progress rate of "1" means a state in which a command is determined. Note that the method is not limited to that described above. Alternatively, a method of recognizing a gesture in a direction intended by the user from the motion trajectory of the hand including before and after a turning point and outputting a command to the corresponding direction may be used.

The control unit 140d selects the first mode or the second mode according to the result of determination by the comparing unit 130. When the current state is the first mode, the control unit 140d then selects output of the result of recognition by the first recognizing unit 150d and controls the display process of the screen to be displayed on the display unit 1 according to the recognition result. When the current state is the second mode, on the other hand, the control unit 140d selects output of the result of recognition by the second recognizing unit 160d and controls the display process of the screen to be displayed on the display unit 1 according to the recognition result. When the second recognizing unit 160d outputs the progress rate when the current state is the second mode, if the output of the progress rate continues, the control unit 140d may select only the result of recognition by the second recognizing unit 160d even if the first mode is entered. Alternatively, the control unit 140d may also select the result of recognition by the first recognizing unit 150d in addition to the result of recognition by the second recognizing unit 160d and control the display process of the screen to be displayed on the display unit 1 according to the results of recognition by the first recognizing unit 150d and the second recognizing unit 160d.

Figure 22:
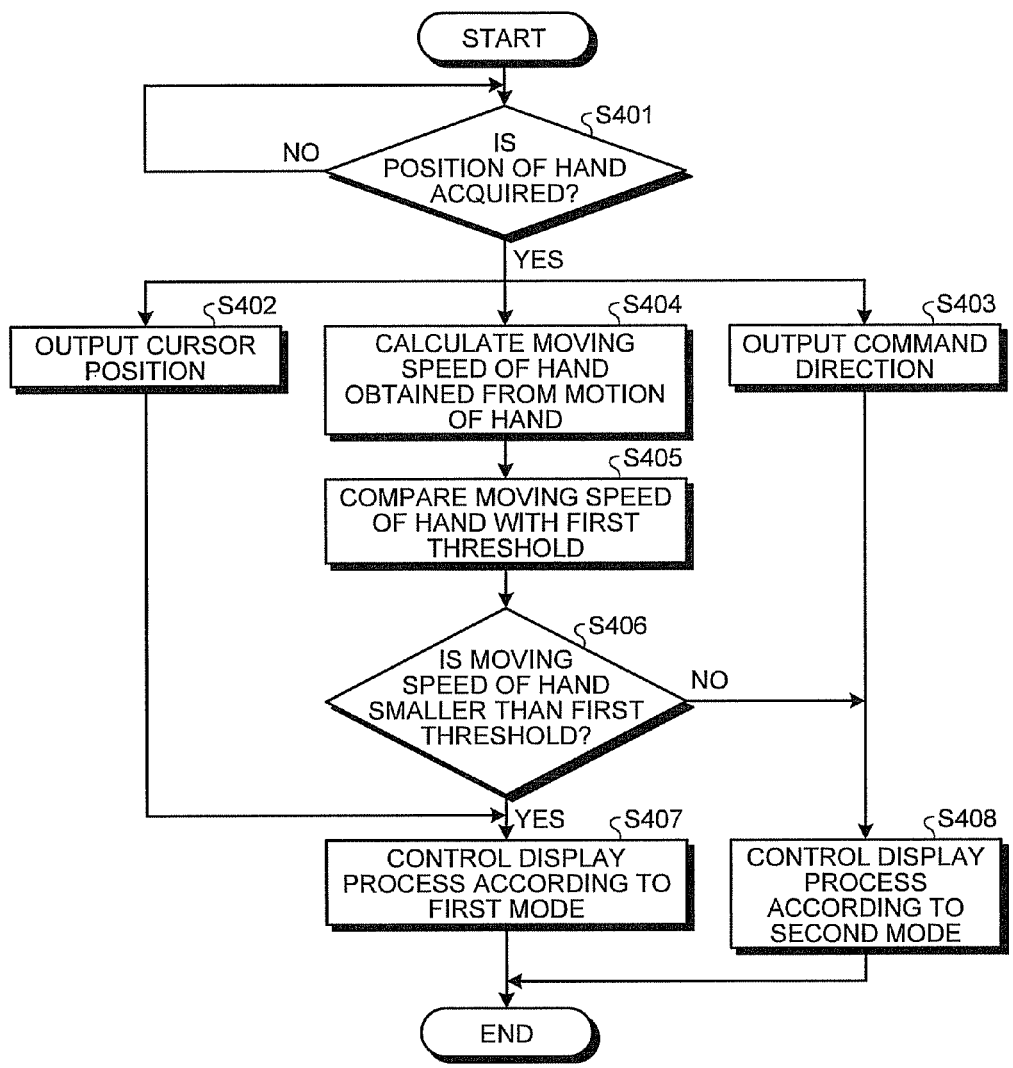
FIG. 22 is a flowchart illustrating overall processing according to Modification 4 of the first embodiment.

Next, a flow of overall processing according to Modification 4 of the first embodiment will be described with reference to FIG. 22. FIG. 22 is a flowchart illustrating an example of the flow of overall processing according to Modification 4 of the first embodiment.

As illustrated in FIG. 22, if the position of a hand of the user is acquired by the acquiring unit 110 (step S401: Yes), processes in steps S402, S403 and S404 are performed. If the position of a hand of the user is not acquired by the acquiring unit 110 (step S401: No), on the other hand, a state of waiting for acquisition of the position is entered.

Then, the first recognizing unit 150*d* recognizes the position and the motion of the hand of the user by a recognition method associated with the first mode from the positions acquired in time series by the acquiring unit 110, and outputs a cursor position that is the recognition result to the control unit 140*d* (step S402). In addition, the second recognizing unit 160*d* recognizes the position and the motion of the hand of the user by a recognition method associated with the second mode from the positions acquired in time series by the acquiring unit 110, and outputs a command direction that is the recognition result to the control unit 140*d* (step S403). The calculator 120 calculates the moving speed of the hand obtained from the motion of the hand (step S404).

The comparing unit 130 compares the moving speed of the hand calculated by the calculator 120 with the first threshold (step S405). Then, if it is determined by the comparing unit 130 that the moving speed of the hand is smaller than the first threshold (step S406: Yes), the control unit 140*d* selects the first mode and controls the display process of the screen according to the cursor position that is the recognition result output by the first recognizing unit 150*d* (step S407). If it is determined by the comparing unit 130 that the moving speed of the hand is equal to or larger than the first threshold (step S406: No), the control unit 140*d* selects the second mode and controls the display process of the screen to be displayed on the display unit 1 according to the command direction that is the recognition result output by the second recognizing unit 160*d* (step S408).

According to the present embodiment, the method for recognizing gestures for controlling the display process of a screen to be displayed on a display unit is selected according to the moving speed of a particular part in a gesture made by the user, a result of recognition of the gesture associated with the selected recognition method is selected, and the display process of the screen to be displayed on the display unit is controlled according to the selected recognition result. As a result, it is possible to improve the operability in switching between operation modes of a device to be operated in response to gestures and to control the display process of a screen to be displayed on a display unit according to a result of recognizing a gesture according to the corresponding mode.

Modification 5 of First Embodiment

Figure 23:
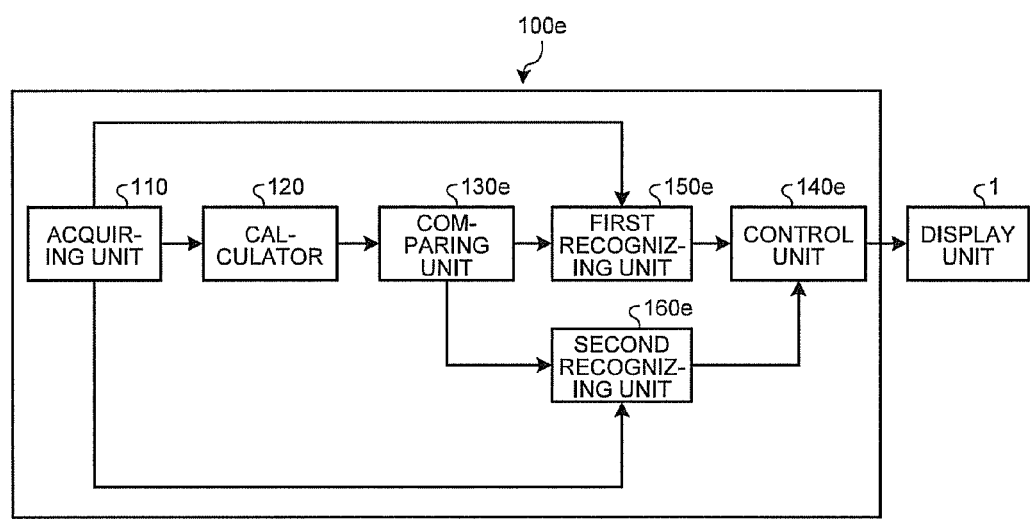
FIG. 23 is a block diagram illustrating a recognition apparatus according to Modification 5 of the first embodiment.

FIG. 23 is a block diagram illustrating an exemplary configuration a recognition apparatus according to Modification 5 of the first embodiment. In Modification 5 of the first embodiment, components similar to those in the first embodiment will be designated by the same reference numerals and detailed description thereof may not be repeated. In Modification 5 of the first embodiment, the functions, configurations and processing of the components other than a comparing unit 130*e*, a control unit 140*e*, a first recognizing unit 150*e* and a second recognizing unit 160*e* to be described below are the same as those in the first embodiment.

As illustrated in FIG. 23, a recognition apparatus 100*e* includes the acquiring unit 110, the calculator 120, the comparing unit 130*e*, the control unit 140*e*, the first recognizing unit 150*e*, and the second recognizing unit 160*e*. Similarly to the first embodiment, the recognition apparatus 100*e* is connected to the display unit 1.

The comparing unit 130*e* uses the moving speed of the hand calculated by the calculator 120 as the feature value and determines the relation between the moving speed of the hand and the first threshold. Then, if the moving speed of the hand is smaller than the first threshold as a result of determining the relation between the moving speed of the hand and the first threshold, the comparing unit 130*e* outputs the determination result to the first recognizing unit 150*e*. If, on the other hand, the moving speed of the hand is equal to or larger than the first threshold as a result of determining the relation between the moving speed of the hand and the first threshold, the comparing unit 130*e* outputs the determination result to the second recognizing unit 160*e*.

In other words, since only recognition according to the first mode, that is, recognition by the first recognizing unit 150*e* needs to be performed when the moving speed of the hand is smaller than the first threshold, the determination result is output to the first recognizing unit 150*e*. Similarly, since only recognition according to the second mode, that is, recognition by the second recognizing unit 160*e* needs to be performed when the moving speed of the hand is equal to or larger than the first threshold, the determination result is output to the second recognizing unit 160*e*.

Upon receipt of the determination result from the comparing unit 130*e*, the first recognizing unit 150*e* obtains the positions in time series from the acquiring unit 110 and recognizes the position and the motion of the particular part such as a hand or a finger of the user from the obtained positions by the recognition method associated with the first mode. The first recognizing unit 150*e* then outputs the recognized position and motion to the control unit 140*e*. The recognition by the first recognizing unit 150*e* is performed when the determination result from the comparing unit 130*e* is received. Correction of positions or the like in the recognition by the first recognizing unit 150*e* is similar to that by the first recognizing unit 150*d* described above.

Upon receipt of the determination result from the comparing unit 130*e*, the second recognizing unit 160*e* obtains the positions in time series from the acquiring unit 110 and recognizes the position and the motion of the particular part such as a hand or a finger of the user from the obtained positions by the recognition method associated with the first mode. The second recognizing unit 160*e* then outputs a command according to the recognized position and the direction of the recognized motion to the control unit 140*e*. The recognition by the second recognizing unit 160*e* is performed when the determination result from the comparing unit 130*e* is received. Output of the progress rate or the like in the recognition by the second recognizing unit 160*e* is similar to that by the second recognizing unit 160*d* described above.

When the recognition result is output by the first recognizing unit 150*e*, the control unit 140*e* selects the first mode and controls the display process of the screen to be displayed on the display unit 1 according to the output recognition result. When the recognition result is output by the second recognizing unit 160*e*, on the other hand, the control unit 140*e* selects the second mode and controls the display process of the screen to be displayed on the display unit 1 according to the output recognition result.

Figure 24:
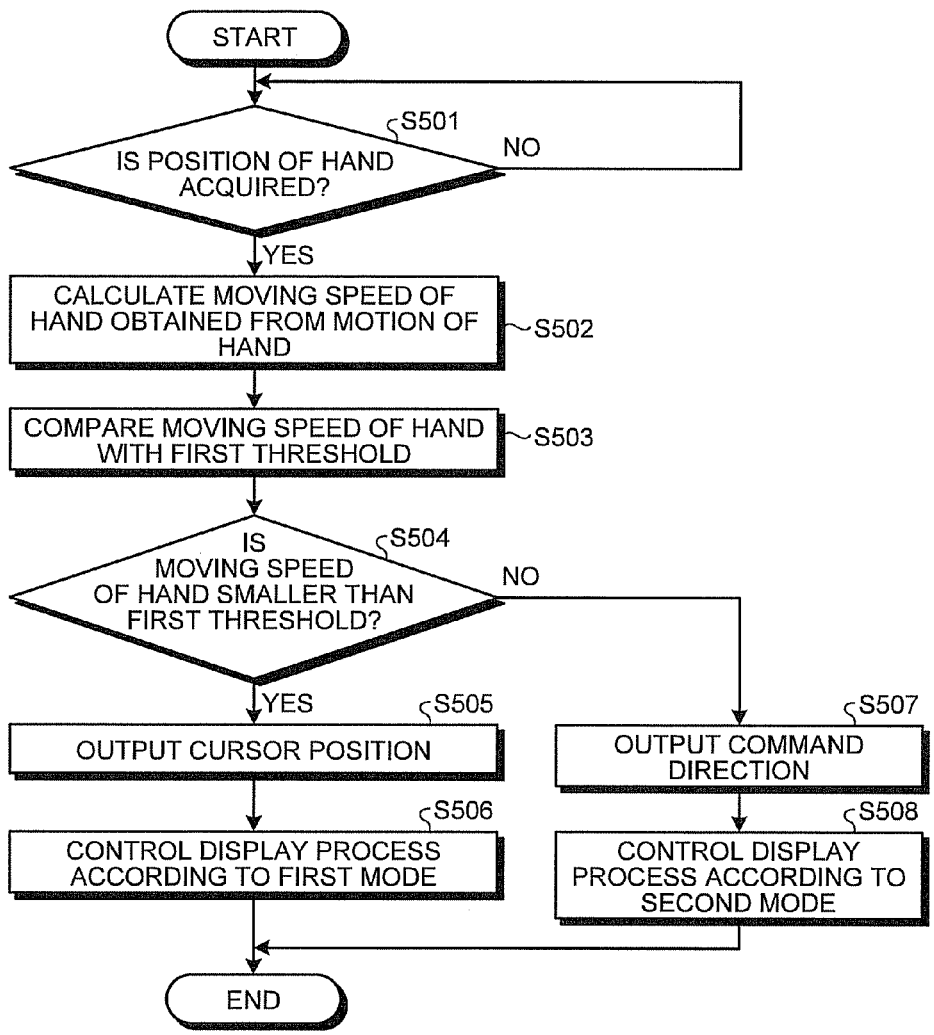
FIG. 24 is a flowchart illustrating overall processing according to Modification 5 of the first embodiment.

Next, a flow of overall processing according to Modification 5 of the first embodiment will be described with reference to FIG. 24. FIG. 24 is a flowchart illustrating an example of the flow of overall processing according to Modification 5 of the first embodiment.

As illustrated in FIG. 24, if the position of a hand of the user is acquired by the acquiring unit 110 (step S501: Yes), the calculator 120 calculates the moving speed of the hand obtained from the motion of the hand (step S502). If the position of a hand of the user is not acquired by the acquiring unit 110 (step S501: No), on the other hand, a state of waiting for acquisition of the position is entered.

The comparing unit 130e compares the moving speed of the hand calculated by the calculator 120 with the first threshold (step S503). Then, if the moving speed of the hand is determined to be smaller than the first threshold (step S504: Yes), the comparing unit 130e outputs the determination result to the first recognizing unit 150e. If the moving speed of the hand is determined to be equal to or larger than the first threshold (step S504: No), on the other hand, the comparing unit 130e outputs the determination result to the second recognizing unit 160e.

The first recognizing unit 150e in receipt of the determination result from the comparing unit 130e obtains the positions in time series from the acquiring unit 110, recognizes the position and the motion of the hand of the user by the recognition method associated with the first mode, and outputs a cursor position that is the recognition result to the control unit 140e (step S505). Subsequently, the control unit 140e in receipt of the recognition result from the first recognizing unit 150e selects the first mode and controls the display process of the screen to be displayed on the display unit 1 according to the cursor position that is the recognition result (step S506).

The second recognizing unit 160e in receipt of the determination result from the comparing unit 130e obtains the positions in time series from the acquiring unit 110, recognizes the position and the motion of the hand of the user by the recognition method associated with the second mode, and outputs a command direction that is the recognition result to the control unit 140e (step S507). Subsequently, the control unit 140e in receipt of the recognition result from the second recognizing unit 160e selects the second mode and controls the display process of the screen to be displayed on the display unit 1 according to the command direction that is the recognition result (step S508).

According to the present embodiment, since only recognition of gestures associated with either mode is performed after output of the result of mode determination, it is possible to reduce the processing load and control the display process of a screen to be displayed on the display unit according to the result of recognizing gestures according to the corresponding mode.

Second Embodiment

Figure 25:
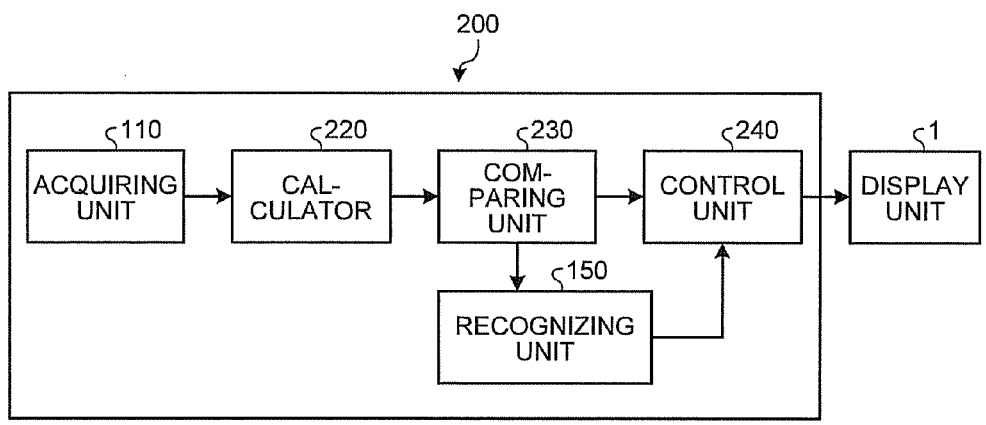
FIG. 25 is a block diagram illustrating a recognition apparatus according to a second embodiment.

FIG. 25 is a block diagram illustrating an exemplary configuration of a recognition apparatus according to a second embodiment. In the second embodiment, components similar to those in the first embodiment will be designated by the same reference numerals and detailed description thereof may not be repeated. In the second embodiment, the functions, configuration and processing of the acquiring unit 110 and the recognizing unit 150 are the same as those in the first embodiment.

As illustrated in FIG. 25, a recognition apparatus 200 includes the acquiring unit 110, a calculator 220, a comparing unit 230, a control unit 240 and the recognizing unit 150. Similarly to the first embodiment, the recognition apparatus 200 is connected to the display unit 1.

The calculator 220 calculates, as a feature value, the number of continuous occurrences of motion of a particular part such as a hand or a finger with time from switching of the sign of a scalar product of a motion vector thereof and a predetermined coordinate axis vector to next switching thereof being within a predetermined time. For example, the calculator 220 calculates, as the feature value, the number of continuous occurrences of motion of a hand with time from a turning point (or a point at which detection is started) to a next turning point being within a predetermined time such as "350 ms". In other words, when a reciprocating motion of a hand such as shaking of a hand from side to side is made by the user, the number of occurrences of turning in the reciprocating motion within a predetermined time is used as the feature value.

The comparing unit 230 uses the number of occurrences of turning in the reciprocating motion of the hand within the predetermined time calculated by the calculator 220 as the feature value and determines the relation between the number of occurrences and a sixth threshold representing a specific value of the number of occurrences. The comparing unit 230 then outputs the result of determination on the relation between the number of occurrences and the sixth threshold to the control unit 240. For example, the sixth threshold is "4". In this case, when a command associated with the second mode is executed according to the reciprocating motion of the hand, the comparing unit 230 determines whether the number of occurrences of turning in the reciprocating motion is larger or smaller than "4". This is because the gesture of sweeping of the hand for moving the cursor associated with the first mode and the gesture of reciprocating motion of the hand for a command associated with the second mode are similar.

The control unit 240 receives the determination result from the comparing unit 230 and selects the first mode if the number of occurrences is smaller than the sixth threshold or the second mode if the number of occurrences is equal to or larger than the sixth threshold. The control unit 240 also controls the display process of the screen to be displayed on the display unit 1 in response to gestures of the user in the first mode or the second mode that is selected. Accordingly, the second embodiment has an advantageous effect that it is possible to prevent selection of both modes in the process of selecting either one of the first mode and second mode when a command associated with the second mode is to be executed according to reciprocating motion of the hand.

Figure 26:
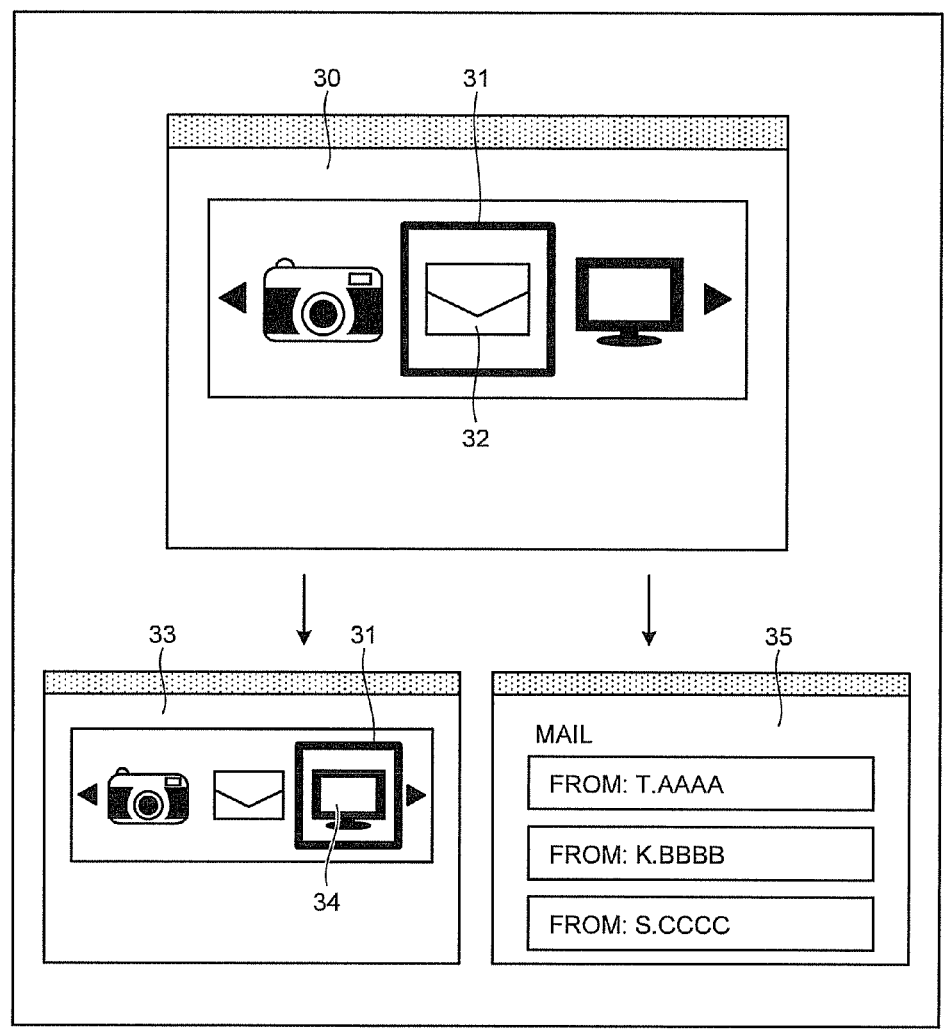
FIG. 26 is a diagram for explaining similarities between gestures.

FIG. 26 is a diagram for explaining similarities between gestures. For example, a screen 30 has a plurality of application icons displayed thereon as illustrated in the upper part of FIG. 26. In this case, when reciprocating motion of the hand is made in a state in which an application 32 is focused by a cursor 31, that is, a state in which the application 32 is selected, recognition results illustrated in the lower-left and the lower-right of FIG. 26 are obtained.

Specifically, the lower-left of FIG. 26 illustrates a state in which the cursor 31 is moved rightward on a screen 33 and thereby an application 34 is selected as a result of motion of the hand from side to side in continuous rightward sweeping of the hand. On the other hand, the lower-right of FIG. 26 illustrates a state in which the application 32 is started on a screen 35 as a result of motion of the hand from side to side in reciprocating motion of the hand. According to the second embodiment, it is possible to prevent selection of both modes (refer to FIG. 26) in the process of selecting either one of the first mode and second mode when a command associated with the second mode is to be executed according to reciprocating motion of the hand. Examples of display of a screen in each mode according to the second embodiment will be described below.

Figure 27:
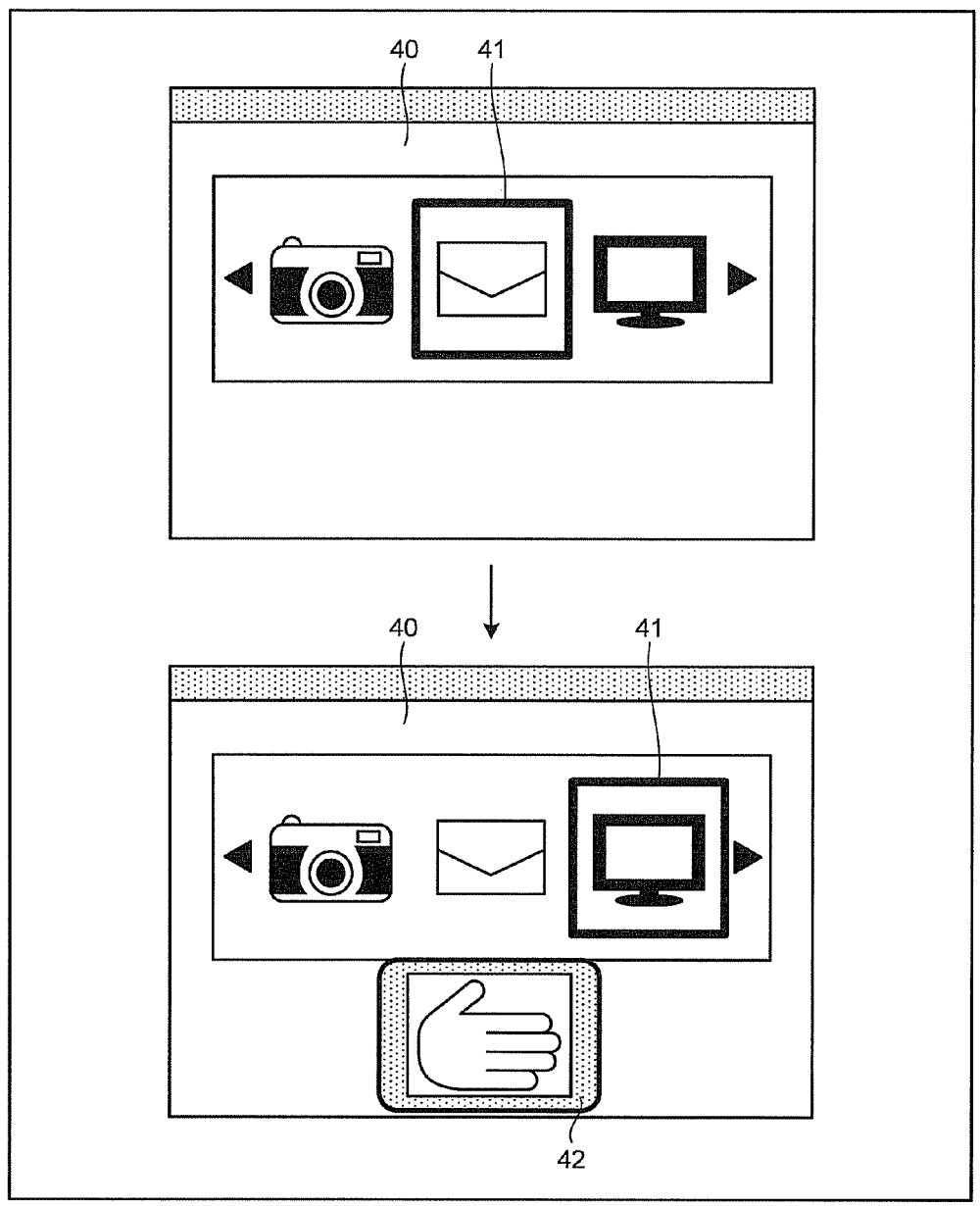
FIG. 27 is a diagram illustrating a screen display in a first mode according to the second embodiment.

FIG. 27 is a diagram illustrating an example of display of a screen in the first mode according to the second embodiment. As illustrated in FIG. 27, a cursor 41 is moved rightward on a screen 40 as a result of rightward sweeping of the hand. In this case, an indication 42 indicating that the cursor 41 moves rightward may be output on the screen.

Figure 28:
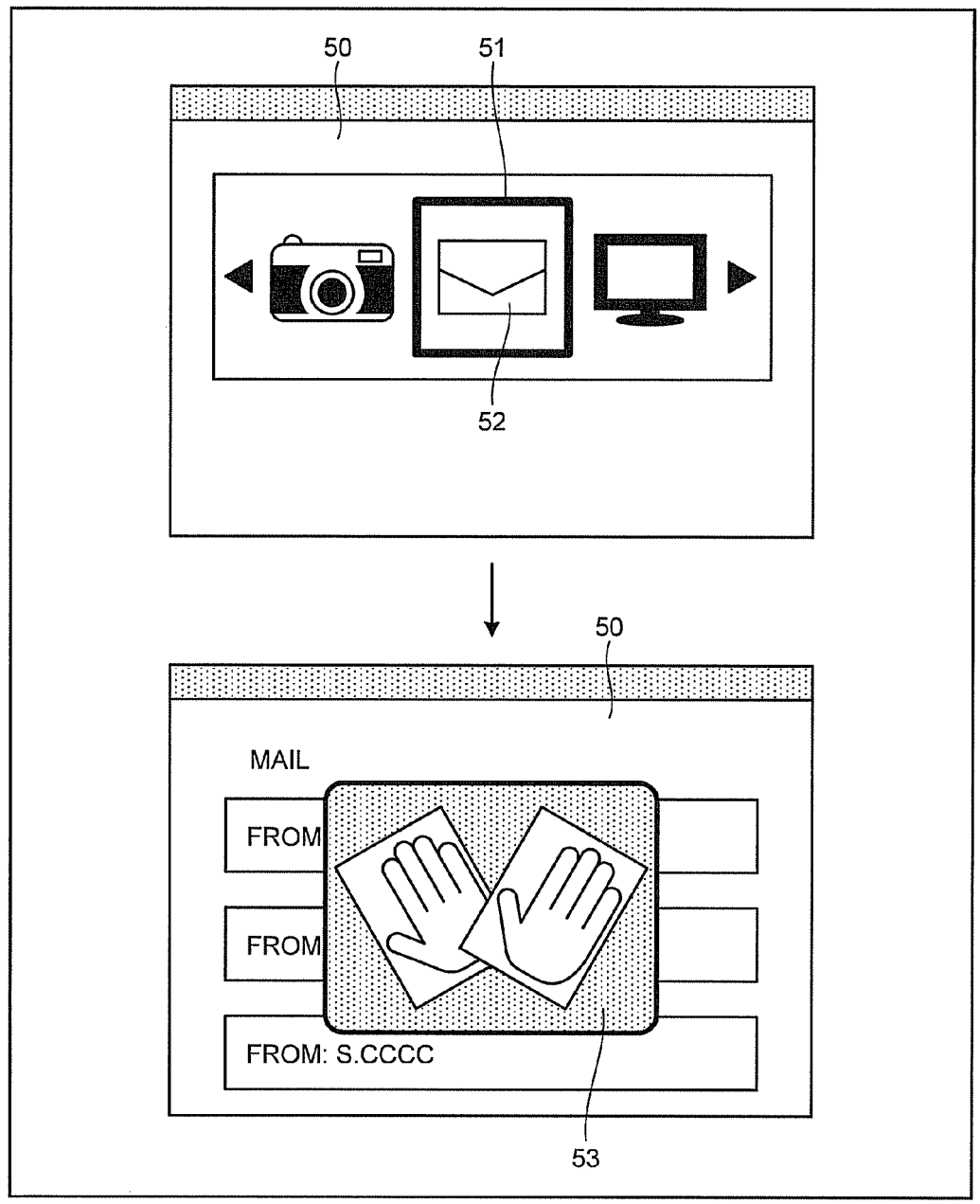
FIG. 28 is a diagram illustrating a screen display in a second mode according to the second embodiment.

FIG. 28 is a diagram illustrating an example of display of a screen in the second mode according to the second embodiment. As illustrated in FIG. 28, an application 52 is started as a result of sweeping of the hand from side to side in a state in which the application 52 is focused by a cursor 51 on a screen 50. In this case, an indication 53 indicating that an icon of a hand is reciprocating from side to side (that the application 52 is to be started) may be output on the screen. Note that the indication 53 may be output while the progress rate is output.

Figure 29:
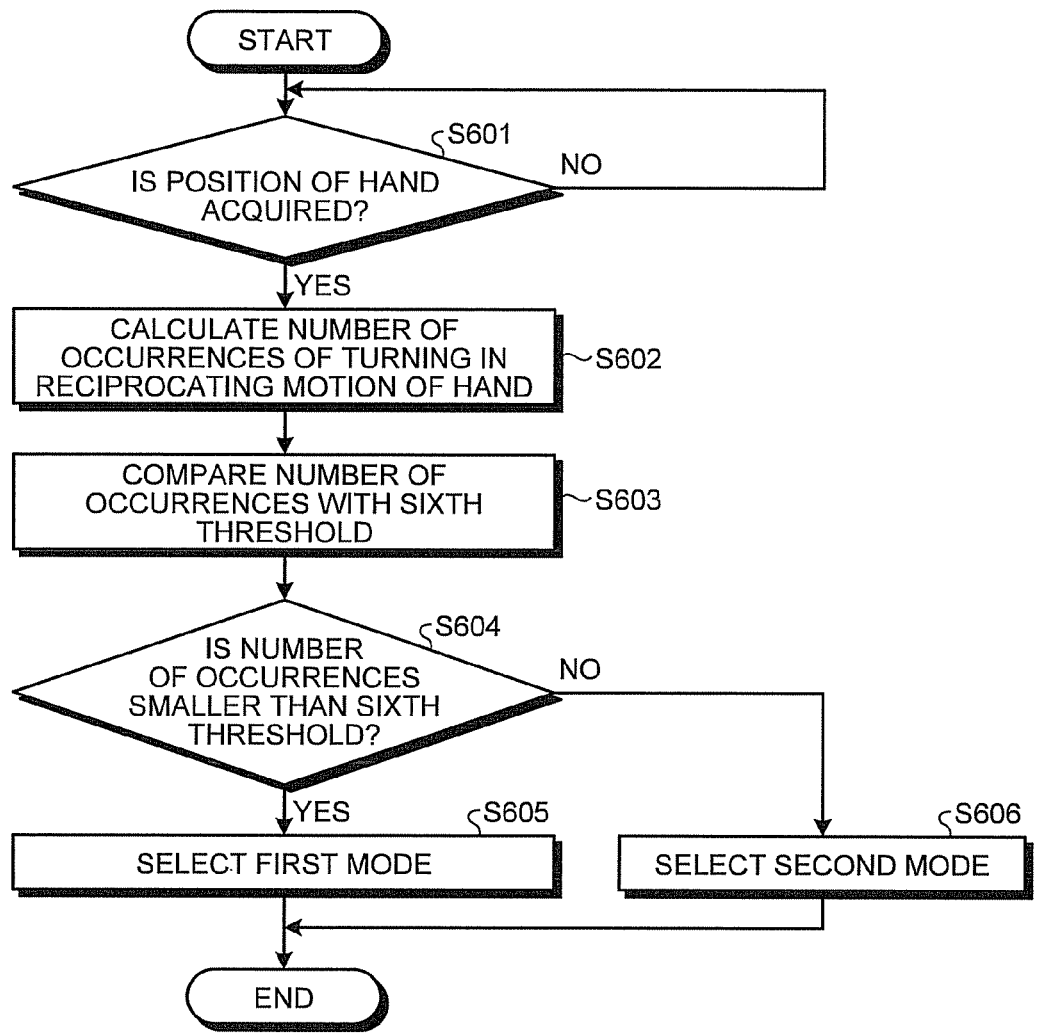
FIG. 29 is a flowchart illustrating overall processing according to the second embodiment.

Next, a flow of overall processing according to the second embodiment will be described with reference to FIG. 29. FIG. 29 is a flowchart illustrating an example of the flow of overall processing according to the second embodiment.

As illustrated in FIG. 29, if the position of a hand of the user is acquired by the acquiring unit 110 (step S601: Yes), the calculator 220 calculates the number of occurrences of turning in reciprocating motion of the hand of the user as a feature value (step S602). If the position of a hand of the user is not acquired by the acquiring unit 110 (step S601: No), on the other hand, a state of waiting for acquisition of the position is entered.

The comparing unit 230 compares the number of occurrences calculated by the calculator 220 with the sixth threshold (step S603). Then, if it is determined by the comparing unit 230 that the number of occurrences is smaller than the sixth threshold (step S604: Yes), the control unit 240 selects the first mode (step S605). If it is determined by the comparing unit 230 that the number of occurrences is equal to or larger than the sixth threshold (step S604: No), the control unit 240 selects the second mode (step S606). Accordingly, the recognizing unit 150 is configured to recognize the motion of the particular part using a first recognition method and a second recognition method which is different from the first recognition method.

According to the present embodiment, since the mode is determined by detecting reciprocating motion of a hand or the like when gestures to be recognized are similar between the first mode and the second mode, it is possible to prevent selection of both modes at the same time.

Third Embodiment

Certain embodiments of the recognition apparatus have been described above. The recognition apparatus, however, may be embodied in various different forms in addition to the embodiments described above. Accordingly, some different embodiments will be described regarding (1) the position of a particular part, (2) the feature value, (3) the temporary display, (4) informing the user of transition, (5) correction of thresholds, (6) similar gestures, (7) output of a recognition result, (8) other applications, and (9) the hardware configuration.

(1) Position of Particular Part

In the embodiments described above, cases in which positions of a particular part such as a hand or a finger of the user are acquired in time series by detecting the particular part of the user that is the subject from each of time series images taken by a camera and tracking the particular part in time series are described. Such positions of the particular part may be represented by coordinate values obtained by normalization with the size of the face or a certain part that is detected first of the user that is a subject. In addition, the positions of the particular part are not limited to positions on a taken image but depth information estimated by a distance sensor or a plurality of imaging device may be used as one of coordinate axes. Examples of the particular part may include the head, an emitting portion of a laser pointer or the like in addition to a hand and a finger. The processing performed by the acquiring unit 110 that acquires the positions of the particular part may be acquisition of the positions of the particular part of the user by using the pattern recognition method in JP-A 2006-268825(KOKAI), the background subtraction method in JP-P 3777650.

(2) Feature Value

In the embodiments described above, cases in which the moving speed of a hand, the number of occurrences of turning in reciprocating motion of a hand, and the like are used as feature quantities are described. The feature value being the moving speed "V" of a hand may be the maximum speed of interval vectors from the latest position to the previous turning point or the starting point of acquisition of positions. Furthermore, the feature value may be a motion acceleration "$\alpha$". For obtaining the acceleration of the latest vector, the motion acceleration "$\alpha$" is calculated by "[(the speed from $P_8$ to $P_7$)−(the speed from $P_7$ to $P_6$)]/($T_8$−$T_7$)" where "$P_8$" represents the latest position acquired at time "$T_8$" (refer to FIG. 3), "$P_7$" represents the previous position acquired at time "$T_7$", and "$P_6$" represents the position before the previous one acquired at time "$T_6$". The motion acceleration "$\alpha$" may be the maximum acceleration of interval vectors from the latest position to the previous turning point or the starting point of acquisition of positions.

The feature value may also be a value of a function expressed by the operated distance "L", the moving speed "V" and the motion acceleration "$\alpha$" of a particular part. The operated distance "L" is a sum of Euclidean distances of vectors from the previous turning point or the starting point of acquisition of positions to the latest position. The feature value, which is represented by "E", may be obtained by simple multiplication such as "$E = V \times L \times \alpha$" or weighted multiplication such as "$E = V \times \sqrt{L}$". The feature value may be a value that varies depending on the conditions as follows:

$$E = V \, (L \geq \text{threshold } L1); \text{ or}$$

$$0 \, (L < \text{threshold } L1).$$

In a form in which gesture operation is performed by using an optical pointer having a light source, the acceleration, for example, can also be used as the feature value. Obviously, the acceleration may be used for gestures of a hand. Since the hand is often shaken in a case of a gesture of a hand, use of acceleration as the feature value for a gesture made by an optical pointer provides higher accuracy.

(3) Temporary Display

In the embodiments described above, cases in which a cursor is displayed as temporary display according to the feature value and the preceding mode are described. Regarding the temporary display, both of the cursor and the block arrow 17 illustrated in FIG. 5 may be displayed, and the size and the brightness may be changed in a proportion of 0% of display associated with the first mode and 100% of display associated with the second mode when the feature value is the first threshold. In this case, when the feature value is the second threshold, the size and the brightness are changed in a proportion of 100% of display associated with the first mode and 0% of display associated with the second mode. Alternatively, the cursor and the block arrow 17 may be morphed according to the proportions mentioned above.

(4) Informing User of Transition

Figure 30:
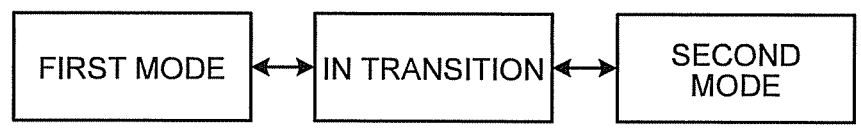
FIG. 30 is a diagram illustrating informing a user of mode transition.

In the embodiments described above, cases in which the user is informed of transition between modes by displaying a cursor as temporary display are described. Informing the user of mode transition may also be performed by displaying a current mode on an arbitrary position on the screen. FIGS. 30 and 31 are diagrams illustrating examples of informing the user of mode transition. As illustrated in FIG. 30, any one of "FIRST MODE", "IN TRANSITION" and "SECOND MODE" is illuminated or made to blink on the display. "IN TRANSITION" illustrated in FIG. 30 refers to a state in which the cursor is displayed as temporary display.

Figure 31:
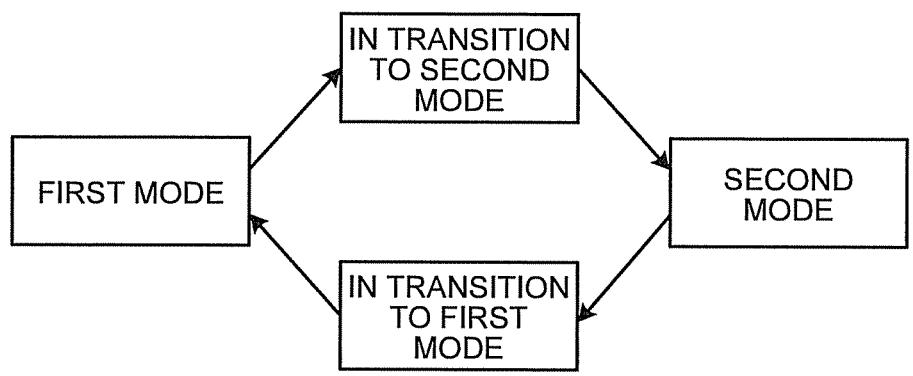
FIG. 31 is a diagram illustrating informing a user of mode transition.

Alternatively, as illustrated in FIG. 31, any one of "FIRST MODE", "IN TRANSITION TO SECOND MODE", "SECOND MODE" and "IN TRANSITION TO FIRST MODE" is illuminated or made to blink on the display. "IN TRANSITION TO FIRST MODE" and "IN TRANSITION TO SECOND MODE" illustrated in FIG. 31 each refer to a state in which the cursor is displayed as temporary display different from the other". Specifically, "IN TRANSITION TO FIRST MODE" corresponds to "temporary display B" while "IN TRANSITION TO SECOND MODE" corresponds to "temporary display A".

(5) Correction of Thresholds

In the embodiments described above, a case in which a value that is larger than the first threshold by a predetermined value is used as the fourth threshold and a value that is smaller than the first threshold by a predetermined value is used as the fifth threshold so as to use thresholds that are corrected depending on the modes is described. Regarding the correction of thresholds, thresholds obtained by correction opposite to that described above may be used. Specifically, a fourth threshold that is smaller than the first threshold by a predetermined value is used in the first mode and a fifth threshold that is larger than the first threshold by a predetermined value is used in the second mode. Thresholds obtained by correction may also be used for the second threshold and the third threshold in addition to those for the first threshold. Correction of the second threshold and the third threshold may be addition or subtraction of the same value as that added or subtracted for the correction of the first threshold, or may be made using values obtained by multiplying the second threshold and the third threshold by a ratio of "the fourth threshold/the first threshold" or "the fifth threshold/the first threshold".

Figure 32:
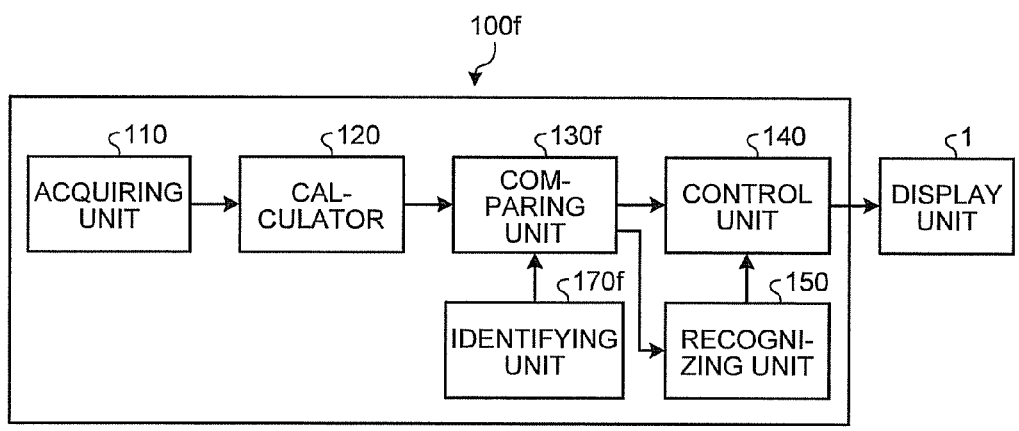
FIG. 32 is a block diagram illustrating a recognition apparatus additionally including an identifying unit.

Correction of thresholds may also be made by changing the thresholds depending on users. FIG. 32 is a block diagram illustrating an exemplary configuration of a recognition apparatus additionally including an identifying unit according to the third embodiment. As illustrated in FIG. 32, a recognition apparatus 100*f* includes the acquiring unit 110, the calculator 120, a comparing unit 130*f*, the control unit 140, the recognizing unit 150 and an identifying unit 170*f*. Similarly to the first embodiment, the recognition apparatus 100*f* is connected to the display unit 1. In FIG. 32, components similar to those in the first embodiment will be designated by the same reference numerals and detailed description thereof may not be repeated. In FIG. 32, the functions, configurations and processing of the components other than the comparing unit 130*f* and the identifying unit 170*f* to be described below are the same as those in the first embodiment.

In the recognition apparatus 100*f*, an average magnitude of shaking, an average moving speed and the like of the hand when making a gesture are obtained in advance for each user from a history of past operations by the user. The identifying unit 170*f* identifies a user that is a subject. For example, the identifying unit 170*f* performs face recognition of the user that has made a gesture from a picture taken by the camera 11, and outputs the identification result to the comparing unit 130*f*. For identification of a user, any method capable of identifying a user such as fingerprint authentication may be used instead of face recognition.

Upon receipt of the result of identifying a user from the identifying unit 170*f*, the comparing unit 130*f* corrects the value of a first threshold on the basis of a ratio of the average of the moving speed of the hand associated with the user and an assumed standard moving speed of a hand. The comparing unit 130*f* then uses the moving speed of the hand calculated by the calculator 120 as the feature value and determines the relation between the moving speed of the hand and the corrected first threshold. Subsequently, the comparing unit 130*f* outputs the determination result on the relation between the moving speed of the hand and the corrected first threshold to the control unit 140. The correction of thresholds may also be made on the second threshold in the same manner as above in addition to the first threshold.

Figure 33:
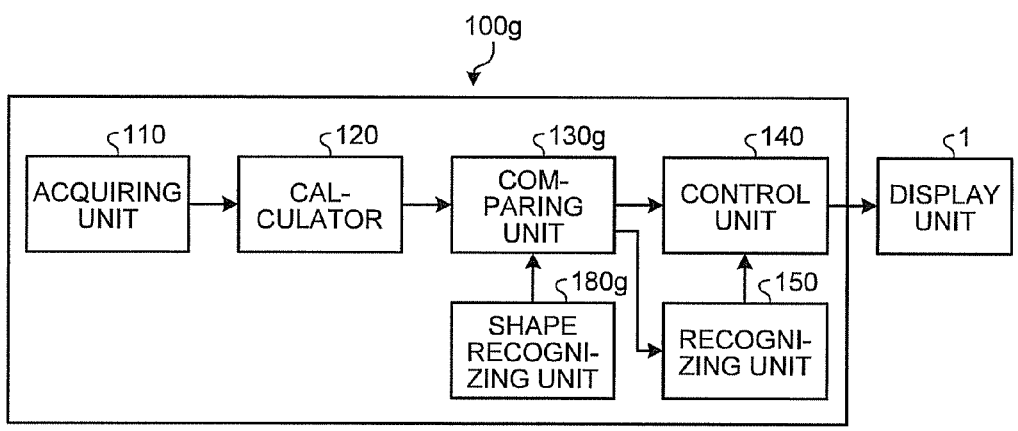
FIG. 33 is a block diagram illustrating a recognition apparatus additionally including a shape recognizing unit.

The correction of thresholds may also be made in such a manner as changing a threshold according to the shape of the particular part. FIG. 33 is a block diagram illustrating an exemplary configuration of a recognition apparatus additionally including a shape recognizing unit according to the third embodiment. As illustrated in FIG. 33, a recognition apparatus 100*g* includes an acquiring unit 110, a calculator 120, a comparing unit 130*g*, a control unit 140, the recognizing unit 150 and a shape recognizing unit 180*g*. Similarly to the first embodiment, the recognition apparatus 100*g* is connected to a display unit 1. In FIG. 33, components similar to those in the first embodiment will be designated by the same reference numerals and detailed description thereof may not be repeated. In FIG. 33, the functions, configurations and processing of the components other than the comparing unit 130*g* and the shape recognizing unit 180*g* to be described below are the same as those in the first embodiment.

In the recognition apparatus 100*g*, thresholds are corrected by using the shape of the particular part such as a hand or a finger in order to improve the accuracy of mode selection. The shape recognizing unit 180*g* recognizes the shape of the particular part such as a hand or a finger. For example, the shape recognizing unit 180*g* recognizes the shape of the palm of the user that has made a gesture from a picture taken by the camera 11 and outputs the recognition result to the comparing unit 130*g*.

Upon receipt of the result of recognizing the shape of the palm from the shape recognizing unit 180*g*, the comparing unit 130*g* calculates the degree of agreement between the shape of the palm that is the recognition result and a predetermined shape, and increases the first threshold by a predetermined value when the degree of agreement is larger than a predetermined degree of agreement. The comparing unit 130*g* also decreases the first threshold by a predetermined value when the degree of agreement is smaller than the predetermined degree of agreement. The comparing unit 130*g* then determines the relation between the moving speed of the hand calculated by the calculator 120 and the corrected first threshold. Subsequently, the comparing unit 130*g* outputs the determination result on the relation between the moving speed of the hand and the corrected first threshold to the control unit 140. The correction of thresholds may also be made on the second threshold in the same manner as above in addition to the first threshold. Specifically, if the degree of agreement between the shape of the particular part making a gesture and the predetermined shape is high, it is likely that a gesture associated with the first mode in which many simple gestures with simple motion such as the one for moving a cursor are included is being made. Accordingly, when the degree of agreement is high, a threshold that is larger than the first threshold by a predetermined value is used since the gesture is likely to be determined as one associated with the first mode.

(6) Similar Gestures

In the embodiments described above, cases in which the number of occurrences of turning in reciprocating motion of a hand within a predetermined time is used as the feature value to select appropriate modes for similar gestures. For the feature value, the number of motions that switched the sign of a scalar product of a motion vector of the particular part and a predetermined coordinate axis vector within a predetermined time in the past may be used. For example, in the example of FIG. 3, when where "$P_1$" to "$P_8$" are within the predetermined time in the past, the calculator 220 obtains a scalar product of each of the motion vectors for "$P_1$" to "$P_8$" and a fixed coordinate axis vector. In the example of FIG. 3, vectors from "$P_1$" to "$P_3$" are leftward, vectors from "$P_3$" to "$P_6$" are rightward, and vectors from "$P_6$" to "$P_8$" are leftward. Accordingly, the sign of the scalar product of each of the motion vectors and the fixed coordinate axis vector changes in the order of "plus", "minus", "plus" or "minus", "plus", "minus". In the example of FIG. 3, the number of motions is therefore "2". The processing performed by the comparing unit 230 and the control unit 240 is the same as that in the embodiments described above.

When the distance over which the hand moves back and forth in the reciprocating motion of the hand is shorter, it can be deemed that a gesture associated with the second mode is being made. Accordingly, in the calculation of the feature value, a condition that the distance from a point where the sign of a scalar product of a motion vector and the predetermined coordinate axis vector is switched to a next point where the sign is switched is a within a predetermined scalar range in the reciprocating motion of the hand is added. For example, in the example of FIG. 3, if each of the distances from "$P_1$" to "$P_3$", from "$P_3$" to "$P_6$" and from "$P_6$" to "$P_8$" is within the predetermined scalar range, the calculator 220 counts the whole number of times the sign of scalar products is switched and obtains the number of times as the feature value.

(7) Output of Recognition Result

In the embodiments described above, cases in which a result of recognizing a gesture is output by the first recognizing unit 150d, the second recognizing unit 160d and the like are described. The progress rate to determination of a command may also be output depending on the recognition method of the first mode. In addition, even in the recognition method of the second mode, the progress rage may be output until it is determined that a gesture is a reciprocating motion of a hand, that is, while the reciprocating motion of the hand continues within a predetermined time. Even if the second mode is entered while the output of the progress rate by the first recognizing unit 150d continues in the first mode, the result of recognition by the first recognizing unit 150d may be output. Similarly in the second mode, even if the first mode is entered while the output of the progress rate by the second recognizing unit 160d continues in the second mode, the result of recognition by the second recognizing unit 160d may be output. This means a state in which recognition results are output from both of the first recognizing unit 150d and the second recognizing unit 160d. In this state, when the progress rate has become "0.8" or higher for one of the recognition results, output of the other recognition result may be stopped, for example.

(8) Other Applications

Figure 34:
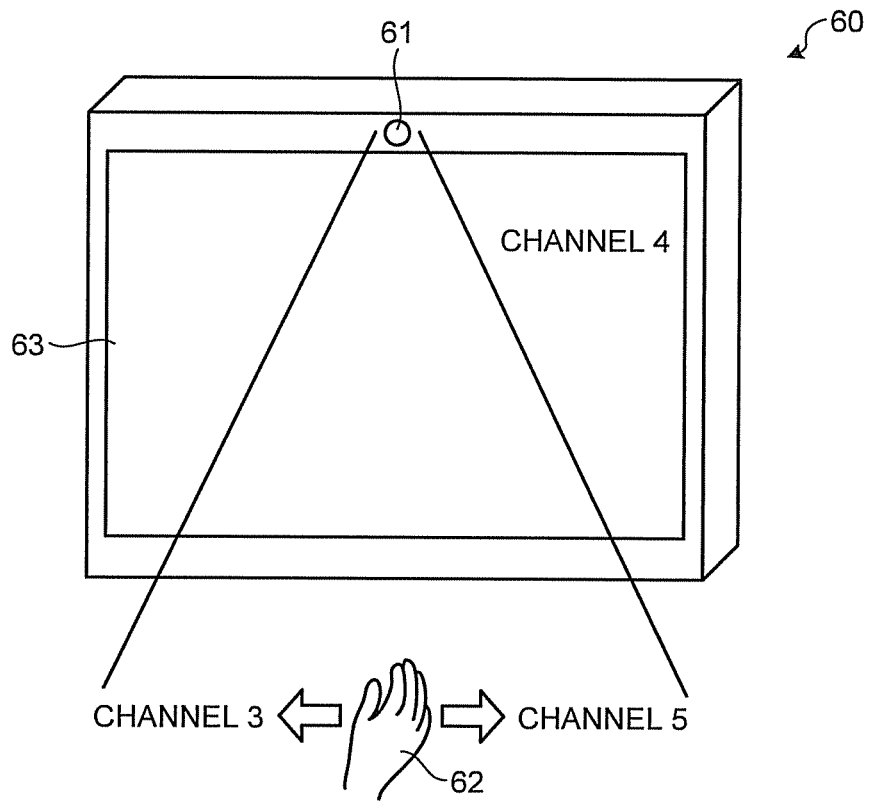
FIG. 34 is a diagram in which a recognition apparatus is applied to a television set.

In the embodiments described above, a case in which the recognition apparatus is applied to an information processing device such as a PC is described. Application of the recognition apparatus is not limited to a PC, but the recognition apparatus can be applied to various devices. FIG. 34 is a diagram illustrating an example in which the recognition apparatus is applied to a television set. A television set 60 illustrated in FIG. 34 is equipped with a camera 61 that images a viewer of the television set 60. The television set 60 detects and tracks a hand 62 of the viewer as the particular part and recognizes a gesture of the hand 62. In FIG. 34, "CHANNEL 4" is currently displayed on a television screen 63. The viewer can change the channel to "CHANNEL 3" by making a gesture of moving the hand 62 leftward or to "CHANNEL 5" by making a gesture of moving the hand 62 rightward.

Figure 35:
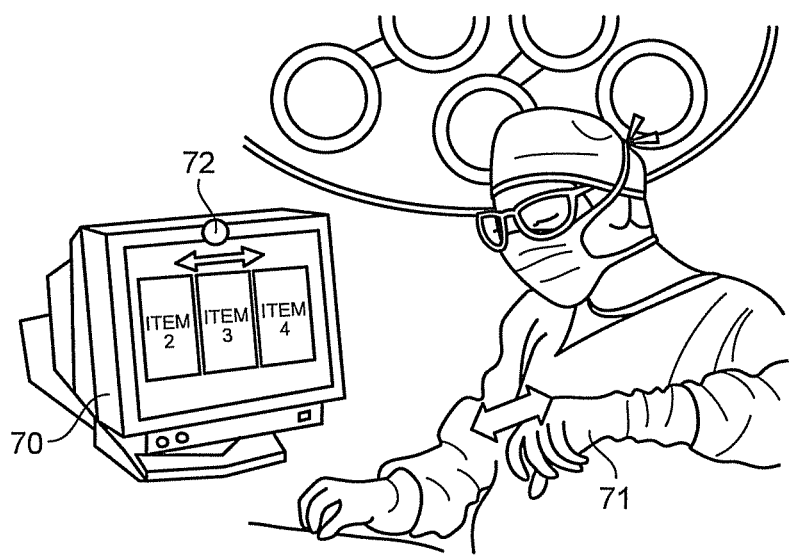
FIG. 35 is a diagram in which a recognition apparatus is applied to a medical information terminal.

FIG. 35 is a diagram illustrating an example in which the recognition apparatus is applied to a medical information terminal. An information terminal 70 illustrated in FIG. 35 is equipped with the recognition apparatus according to any of the embodiments described above and used for providing information to a surgeon performing an operation. Since it is preferable for a surgeon performing an operation to keep a hand 71 clean, it is difficult to directly touch with the hand 71 the information terminal 70 that provides information such as monitoring information and test results of a patient to a surgeon. Accordingly, application of the recognition apparatus according to any of the embodiments described above to the information terminal 70 allows the surgeon to operate the information terminal 70 by making a gesture with the hand 71 without touching the information terminal 70. The information terminal 70 is equipped with a camera 72 that images the surgeon. The information terminal 70 detects and tracks the hand 71 of the surgeon as the particular part, recognizes the gesture, and executes a command for scrolling in the detected direction of the gesture, a command for changing display information or the like on the information terminal 70.

Note that application of the recognition apparatus is not limited to a PC, a television set and a medical information terminal but the recognition apparatus can also be applied to other devices such as game machines. Specifically, the recognition apparatus relates to a gesture interface for a user to easily operate a device without holding or wearing a remote controller, a sensor, a marker or the like, and can be applied to a device capable of performing operation of switching between menus for controlling the device, contents displayed on the device or the like.

(9) Hardware Configuration

Figure 36:
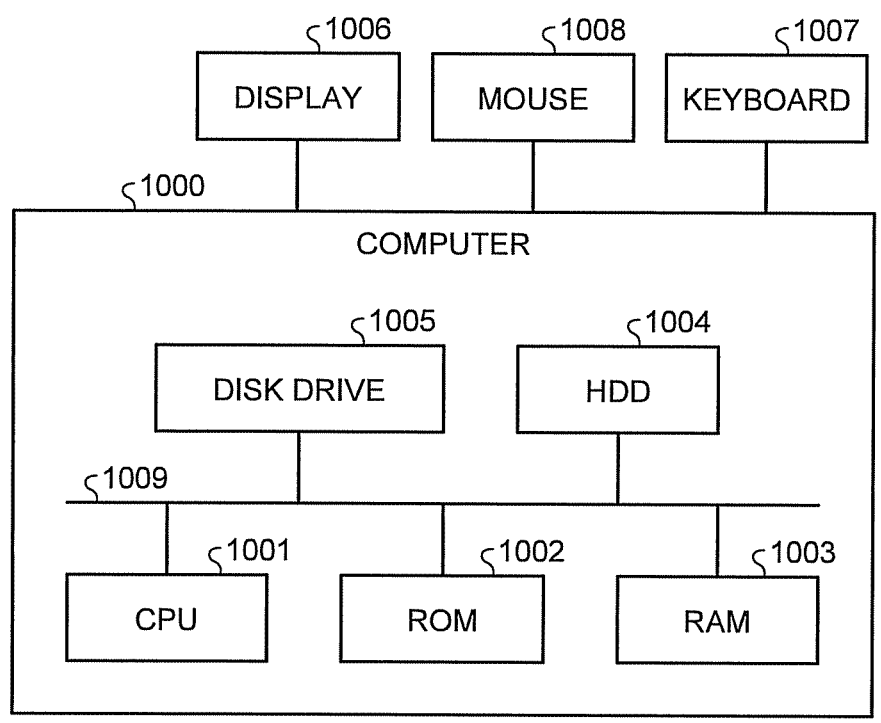
FIG. 36 is a diagram in which programs are implemented using a computer.

FIG. 36 is a diagram illustrating implementation of recognition programs using a computer. As illustrated in FIG. 36, a computer 1000 that is a recognition apparatus includes a control device such as a CPU 1001, a storage device such as a ROM 1002 and a RAM 1003, an external storage device such as a hard disk drive (HDD) 1004 and a disk drive 1005, a display device such as a display 1006, and an input device such as a keyboard 1007 and a mouse 1008 that are connected via a bus 1009, which is a hardware configuration utilizing a common computer system.

In one aspect, recognition programs to be executed by the recognition apparatus are recorded on a computer readable recording medium such as a CD-ROM, a flexible disk (FD), a CD-R and a digital versatile disk (DVD) in a form of a file that can be installed or executed, and provided therefrom. Alternatively, the recognition programs to be executed by the recognition apparatus may be stored on a computer system connected to a network such as the Internet, and provided by being downloaded via the network. Still alternatively, the recognition programs to be executed by the recognition apparatus may be provided or distributed through a network such as the Internet. Still alternatively, the recognition programs may be embedded on a ROM or the like in advance and provided therefrom.

The recognition programs to be executed by the recognition apparatus have a modular structure including the respective units (the acquiring unit 110, the calculator 120, the comparing unit 130, the control unit 140 and the recognizing unit 150) described above. In an actual hardware configuration, a CPU (a processor) reads the recognition programs from the storage medium and executes the programs, whereby the respective units described above are loaded on a main storage device and the acquiring unit 110, the calculator 120, the comparing unit 130, the control unit 140 and the recognizing unit 150 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition apparatus comprising:
   an acquiring unit configured to acquire positions of a particular part of a user in time series;
   a calculator configured to calculate a feature value of a motion of the particular part from the positions acquired in time series;
   a determination unit configured to determine a relation between the feature value and a first threshold, and determine the relation between the feature value and a second threshold that is smaller than the first threshold;
   a control unit configured to control, when the feature value is equal to or larger than the second threshold and smaller than the first threshold, a display process of a screen of a display unit for informing that there is possibility of a recognition method for recognizing a position or a motion of the particular part being switched.

2. The apparatus according to claim 1, wherein
   the determination unit further determines the relation between the feature value and a third threshold that is larger than the first threshold, and
   when the feature value is equal to or larger than the first threshold and smaller than the third threshold, the control unit selects a second recognition method that is different from a first recognition method, the first recognition method being selected when the feature value is smaller than the first threshold.

3. The apparatus according to claim 1, wherein
   the control unit increases or decreases at least one of a transparency, a brightness, a blinking speed, and a pop-up amount of an object to be displayed on the display unit according to the feature value to control the display process of the screen.

4. The apparatus according to claim 1, wherein
   the control unit controls the display process such that a proportion of shape change of an object to be displayed on the display unit according to a first recognition method that is selected when the feature value is smaller than the first threshold is 0 percent and a proportion of shape change of an object to be displayed on the display unit according to a second recognition method that is different from the first recognition method is 100 percent when the feature value is the first threshold, and controls the display process such that the proportion of shape change of the object according to the first recognition method is 100 percent and the proportion of shape change of the object according to the second recognition method is 0 percent when the feature value is the second threshold.

5. The apparatus according to claim 1, further comprising:
   a first recognizing unit configured to recognize a position or a motion of the particular part by a first recognition method that is selected when the feature value is smaller than the first threshold, from the positions acquired in time series by the acquiring unit; and
   a second recognizing unit configured to recognize a position or a motion of the particular part by a second recognition method that is selected when the feature value is equal to or larger than the first threshold and that is different from the first recognition method, from the positions acquired in time series by the acquiring unit, wherein
   the control unit controls the display process according to a result of recognition by the first recognizing unit when the first recognition method is selected and controls the display process according to a result of recognition by the second recognizing unit when the second recognition method is selected.

6. The apparatus according to claim 1, further comprising:
   a first recognizing unit configured to obtain the positions acquired by the acquiring unit in time series according to a result of determination by the determination unit and to recognize a position or a motion of the particular part by a first recognition method that is selected when the feature value is smaller than the first threshold, from the obtained positions; and
   a second recognizing unit configured to obtain the positions acquired by the acquiring unit in time series according to a result of determination by the determination unit and to recognize a position or a motion of the particular part by a second recognition method that is selected when the feature value is equal to or larger than the first threshold and that is different from the first recognition method, from the obtained positions, wherein
   either one of the recognitions by the first recognizing unit and the second recognizing unit is selectively performed, and
   when the recognition by the first recognizing unit is performed, the control unit controls the display process according to the result of recognition by the first recognizing unit, while when the recognition by the second recognizing unit is performed, the control unit controls the display process according to the result of recognition by the second recognizing unit.

7. The apparatus according to claim 1, wherein when a state in which the feature value is equal to or larger than the first threshold continues for a predetermined time or longer while a first recognition method is selected when the feature value is smaller than the first threshold, the control unit selects a second recognition method that is different from the first recognition method.

8. The apparatus according to claim 1, wherein when a state in which the feature value is smaller than the first threshold continues for a predetermined time or longer while a second recognition method is selected when the feature value is equal to or larger than the first threshold, the control unit selects a first recognition method that is different from the second recognition method.

9. The apparatus according to claim 1, wherein when the feature value is equal to or larger than a fourth threshold that is larger than the first threshold by a predetermined value while a first recognition method is selected when the feature value is smaller than the first threshold, the control unit selects a second recognition method that is different from the first recognition method.

10. The apparatus according to claim 1, wherein when the feature value is smaller than a fifth threshold that is smaller than the first threshold by a predetermined value while a second recognition method is selected when the feature value is equal to or larger than the first threshold, the control unit selects a first recognition method that is different from the second recognition method.

11. The apparatus according to claim 1, further comprising an identifying unit configured to identify a user who is a subject, wherein
the determination unit uses at least one of the first threshold increased or decreased by a value according to the identified user and the second threshold increased or decreased by a value according to the identified user to determine the relation with the feature value.

12. The apparatus according to claim 1, further comprising a shape recognizing unit configured to recognize a shape of the particular part, wherein
the determination unit uses at least one of the first threshold increased or decreased by a value according to a degree of agreement between the recognized shape of the particular part and a predetermined shape and the second threshold increased or decreased by a value according to the degree of agreement to determine the relation with the feature value.

13. The apparatus according to claim 1, wherein the calculator calculates at least one of a distance, a speed and an acceleration of motion of the particular part as the feature value.

14. The apparatus according to claim 13, wherein
when the distance of the motion as the feature value being within a predetermined range continues for a predetermined time or longer while a second recognition method is selected when the feature value is equal to or larger than the first threshold, the control unit selects a first recognition method that is different from the second recognition method.

15. A recognition apparatus comprising:
an acquiring unit configured to acquire positions of a particular part of a user in time series;
a calculator configured to calculate, as a feature value, the number of continuous occurrences of motion of the particular part with time from switching of a sign of a scalar product of a motion vector of the particular part and a predetermined coordinate axis vector to next switching of a sign being within a predetermined time on a condition for the motion of the particular part that a distance from a point where the sign of the scalar product of the motion vector of the particular part and the predetermined coordinate axis vector is switched to the next point where the sign is switched is within a predetermined scalar range and on the basis of the positions acquired in time series;
a determination unit configured to determine a relation between the number of occurrences and a sixth threshold;
a control unit configured to select a first recognition method for recognizing a position or a motion of the particular part when the number of occurrences is smaller than the sixth threshold and select a second recognition method that is different from the first recognition method when the number of occurrences is equal to or larger than the sixth threshold.

16. A recognition apparatus comprising:
an acquiring unit configured to acquire positions of a particular part of a user in time series;
a calculator configured to calculate, as a feature value, the number of motions that switched a sign of a scalar product of a motion vector of the particular part and a predetermined coordinate axis vector within a predetermined time in a past on a condition for the motion of the particular part that a distance from a point where the sign of the scalar product of the motion vector of the particular part and the predetermined coordinate axis vector is switched to the next point where the sign is switched is within a predetermined scalar range and on the basis of the positions acquired in time series;
a determination unit configured to determine the relation between the number of occurrences and a sixth threshold; and
a control unit configured to select a first recognition method for recognizing a position or a motion of the particular part when the number of occurrences is smaller than sixth threshold and select a second recognition method that is different from the first recognition method when the number of occurrences is equal to or larger than the sixth threshold.

* * * * *